(12) United States Patent
Kawai

(10) Patent No.: US 10,349,153 B2
(45) Date of Patent: Jul. 9, 2019

(54) OPTICAL MULTIPLEXING AND DEMULTIPLEXING DEVICE, AND METHOD OF CONTROLLING OPTICAL MULTIPLEXING AND DEMULTIPLEXING DEVICE

(71) Applicant: NEC Corporation, Tokyo (JP)

(72) Inventor: Motoyoshi Kawai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/558,353

(22) PCT Filed: Mar. 17, 2016

(86) PCT No.: PCT/JP2016/001549
§ 371 (c)(1),
(2) Date: Sep. 14, 2017

(87) PCT Pub. No.: WO2016/152115
PCT Pub. Date: Sep. 29, 2016

(65) Prior Publication Data
US 2018/0070156 A1    Mar. 8, 2018

(30) Foreign Application Priority Data

Mar. 23, 2015   (JP) ................................. 2015-059061

(51) Int. Cl.
*H04J 14/02*    (2006.01)
*H04Q 11/00*    (2006.01)
(Continued)

(52) U.S. Cl.
CPC ....... *H04Q 11/0005* (2013.01); *H04B 10/032* (2013.01); *H04B 10/29* (2013.01);
(Continued)

(58) Field of Classification Search
CPC ..... H04B 10/27; H04B 10/03; H04J 14/0212; H04Q 11/005
See application file for complete search history.

(56) References Cited

U.S. PATENT DOCUMENTS

2003/0138252 A1*   7/2003   Paiam ................ H04Q 11/0005
                                                        398/49
2006/0210266 A1    9/2006   Aoki
(Continued)

FOREIGN PATENT DOCUMENTS

CN       103718479 A     4/2014
CN       103748818 A     4/2014
(Continued)

OTHER PUBLICATIONS

Extended European Search Report issued by the European Patent Office for European Application No. 16768022.2 dated Feb. 12, 2018 (8 pages).
(Continued)

*Primary Examiner* — Dzung D Tran
(74) *Attorney, Agent, or Firm* — Wilmer Cutler Pickering Hale and Dorr LLP

(57) ABSTRACT

In order to achieve a highly reliable reconfigurable optical add/drop multiplexing (ROADM) device, this optical multiplexing and demultiplexing device is provided with: a first wavelength selection switch which multiplexes, by wavelength, and outputs optical signals contained in a first wavelength multiplexed optical signal; a second wavelength selection switch which multiplexes, by wavelength, and outputs optical signals contained in a second wavelength multiplexed optical signal; an optical switch which, on the basis of the states of the first wavelength selection switch and the second wavelength selection switch, outputs the first wavelength multiplexed optical signal and the second wavelength multiplexed optical signal to the first wavelength
(Continued)

selection switch or the second wavelength selection switch; and a first coupler which couples together the output from the first wavelength selection switch and the output from the second wavelength selection switch.

13 Claims, 13 Drawing Sheets

(51) Int. Cl.
    *H04B 10/032*     (2013.01)
    *H04B 10/29*     (2013.01)

(52) U.S. Cl.
    CPC ...... *H04J 14/0204* (2013.01); *H04J 14/0205* (2013.01); *H04J 14/0209* (2013.01); *H04J 14/0212* (2013.01); *H04Q 2011/0016* (2013.01)

(56) References Cited

U.S. PATENT DOCUMENTS

| | | | |
|---|---|---|---|
| 2010/0034532 A1 | 2/2010 | Ghelfi et al. | |
| 2010/0221004 A1* | 9/2010 | Haslam | H04J 14/0201 398/49 |
| 2012/0076496 A1* | 3/2012 | Yamashita | H04J 14/0284 398/68 |
| 2012/0087658 A1 | 4/2012 | Jander | |
| 2014/0376918 A1* | 12/2014 | Boduch | H04J 14/021 398/83 |
| 2015/0280854 A1 | 10/2015 | Matsukawa et al. | |

FOREIGN PATENT DOCUMENTS

| | | |
|---|---|---|
| EP | 1703762 A2 | 9/2006 |
| JP | 2010-098545 A | 4/2010 |
| JP | 2011-109173 A | 6/2011 |
| JP | 2012-004800 A | 1/2012 |
| JP | 2013-541301 A | 11/2013 |
| JP | 2014-220575 A | 11/2014 |

OTHER PUBLICATIONS

International Search Report, corresponding to PCT/JP2016/001549, dated May 10, 2016, 2 pages.
China Notification of First Office Action issued in Chinese Patent Application No. 201680017657.6, dated Apr. 28, 2019, 22 pages.

* cited by examiner

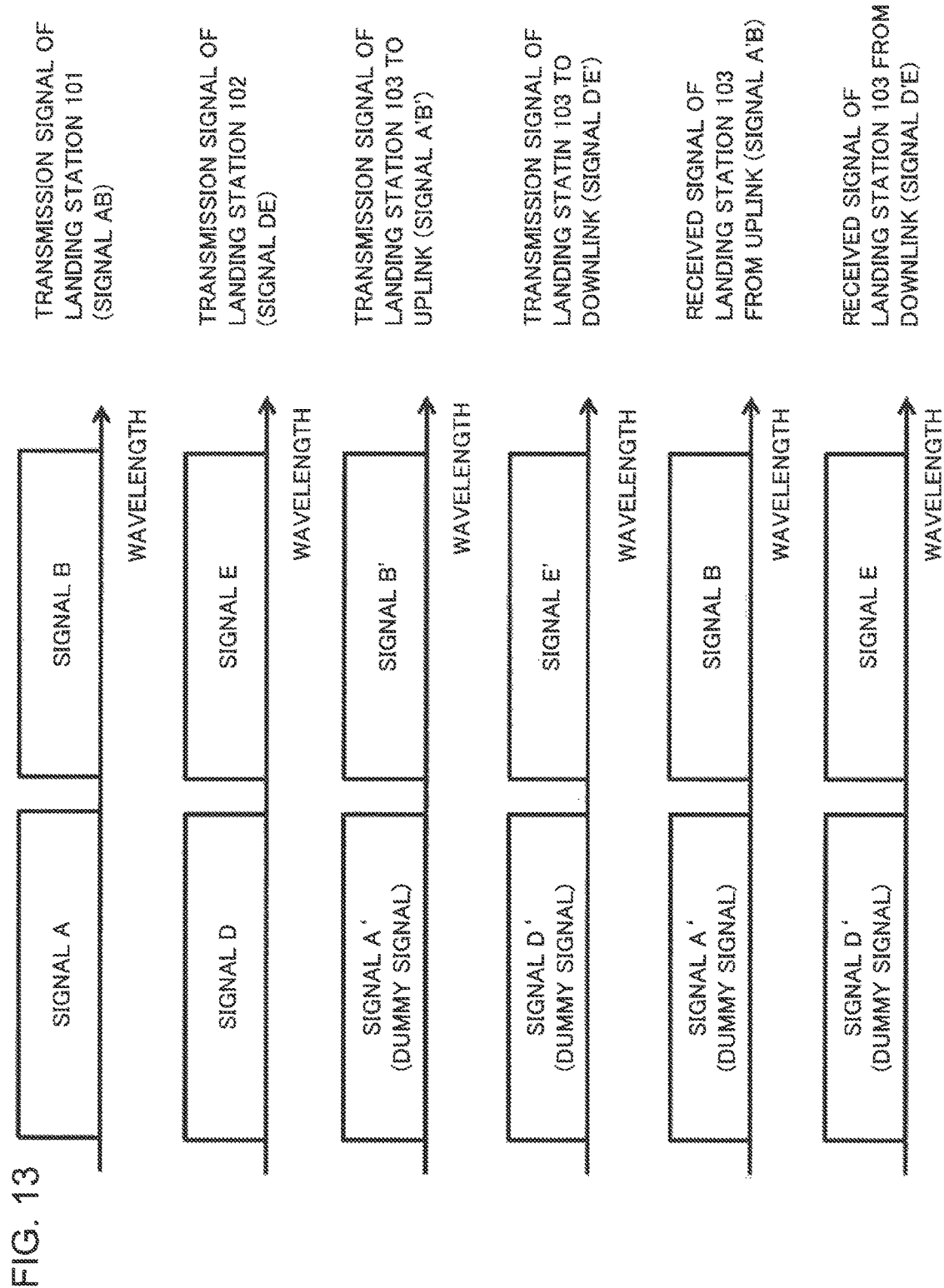

OPTICAL MULTIPLEXING AND DEMULTIPLEXING DEVICE, AND METHOD OF CONTROLLING OPTICAL MULTIPLEXING AND DEMULTIPLEXING DEVICE

CROSS-REFERENCE TO RELATED APPLICATIONS

The present application is a national stage application of International Application No. PCT/JP2016/001549 entitled "Optical Multiplexing and Demultiplexing Device, and Method of Controlling Optical Multiplexing and Demultiplexing Device," filed on Mar. 17, 2016, which claims the benefit of priority from Japanese Patent Application No. JP2015-059061, filed on Mar. 23, 2015, the disclosures of which are incorporated herein in their entirety by reference thereto.

TECHNICAL FIELD

The present invention relates to an optical multiplexing and demultiplexing device and a method of controlling the optical multiplexing and demultiplexing device and, in particular, to an optical add/drop multiplexing (OADM) device including a wavelength selective switch (WSS), and a method of controlling the OADM device including the WSS.

BACKGROUND ART

Optical add/drop multiplexing (OADM) devices, which have been introduced in land-based optical communication networks, have become applied to optical submarine cable systems. As a result, even optical submarine cable systems have been able to flexibly support a wide variety of network configurations. However, OADM functional in a typical optical submarine cable system is provided in a branching device installed on the seafloor. Accordingly, when OADM functional of an optical submarine cable system is to be changed after beginning of operation of the optical submarine cable system, a branching device needs to be raised from the seafloor onto land, and work such as replacing an optical filter needs to be performed depending on a changed network configuration.

On the other hand, in land-based optical communication networks, reconfigurable optical add/drop multiplexing (ROADM) devices have been widely used. An ROADM device allows a network configuration to be changed (reconfigured) after beginning of operation without replacing the OADM device. For example, PTL 1 describes an ROADM device that uses a wavelength selective switch (WSS). A WSS includes three functions: a demultiplexing function of separating input optical signals by a wavelength unit, a switching function for selecting demultiplexed optical signals, and a function of multiplexing selected optical signals. A WSS may further include a function of adjusting an optical signal level with each wavelength. PTL 2 describes an optical cross-connect device including a redundant configuration. In a typical ROADM device, WSSs are provided for each of an uplink and a downlink, and optical signals with predetermined wavelengths are distributed to trunk stations and branch stations.

FIG. 10 is a block diagram illustrating a configuration of a typical optical submarine cable system 90. The optical submarine cable system 90 includes an ROADM device 900 and landing stations 101 to 103. The ROADM device 900 is a branching device installed on the seafloor and is connected to the landing stations 101 to 103 installed ashore. The landing stations 101 to 103 are terminal stations that terminate optical submarine cables. Wavelength division multiplexing (WDM) optical signals (hereinafter referred to as "WDM signals") are transmitted between the landing stations 101 to 103 and the ROADM device 900 by using the optical submarine cables.

Optical signals with some wavelengths among WDM signals transmitted and received by the landing station 101 and the landing station 102 are used for communication with the landing station 103. The landing stations 101 and 102 are also referred to as trunk stations. The landing station 103 is a terminal station that terminates a link (branch link) that branches from a link (trunk link) between the trunk stations and is also referred to as a branch station. In each drawing of the present application, a direction and a link from each of the landing stations 101 and 103 to the landing station 102 are referred to as the "up direction" and "uplink", respectively, and a direction and a link from each of the landing stations 102 and 103 to the landing station 101 are referred to as the "down direction" and "downlink".

FIG. 11 is a diagram illustrating an example of wavelength bands of WDM signals input and output at the ROADM device 900. A signal A and a signal B are transmission signals of the landing station 101. A signal D and a signal E are transmission signals of the landing station 102. The signal A is an optical signal transmitted from the landing station 101 to the landing station 102, and the signal B is an optical signal transmitted from the landing station 101 to the landing station 103. The signal D is an optical signal transmitted from the landing station 102 to the landing station 101, and the signal E is an optical signal transmitted from the landing station 102 to the landing station 103.

A signal A' and a signal B' are transmission signals of the landing station 103 to the uplink, and a signal D' and a signal E' are transmission signals of the landing station 103 to the downlink. The signal B' is an optical signal transmitted from the landing station 103 to the landing station 102, and the signal E' is an optical signal transmitted from the landing station 103 to the landing station 101. The signal A' and the signal D' are dummy signals. The dummy signal is added at the landing station 103 in order to keep optical power of a WDM signal input into an optical submarine repeater installed along the submarine cable within a given range in a system. The dummy signal does not include information to transmit.

The signal A, the signal A', the signal D, and the signal D' belong to the same waveband, and the signal B, the signal B', the signal E, and the signal E' belong to the same waveband. Further, the waveband to which the signal A belongs and the waveband to which the signal B belongs do not overlap with each other. Each of signals A, A', B, B', D, D', E, and E' may be one carrier (carrier wave) optical signal or may include a plurality of carrier optical signals. In the following description, for example, a WDM signal made up of the signal A and the signal B will be denoted as a signal AB. Similarly, a WDM signal made up of other optical signals, such as a signal D and a signal E, will be simply denoted using symbols such as D and E. Further, for example, the signal A is denoted as (A) and a signal AB' is denoted as (AB') in each block diagram.

Propagation of a WDM signal in the up direction in FIG. 10 will be described. A signal AB transmitted from the landing station 101 is branched at a coupler (CPL) 111 in the direction of the landing station 102 and in the direction of the landing station 103. On the other hand, a signal A'B' transmitted from the landing station 103 and having a wavelength band similar to that of the signal AB is input into a WSS 112. The WSS 112 multiplexes and demultiplexes the input signals AB and A'B' to generate a signal AB'. The generated signal AB' is transmitted to the landing station 102.

The ROADM device 900 includes a control circuit 950 for controlling the WSSs 112 and 122. A ratio between a capacity of transmission from the landing station 101 to the landing station 102 and a capacity of transmission from the landing station 101 to the landing station 103 can be changed by controlling the WSS 112 to change wavelength bandwidths of signals A, B, A', and B'. Similarly, in the down direction, a ratio between a capacity of transmission from the landing station 102 to the landing station 101 and a capacity of transmission from the landing station 102 to the landing station 103 can be changed by using a coupler 121 and the WSS 122.

FIG. 12 is a block diagram illustrating a configuration of another typical optical submarine cable system 91. The optical submarine cable system 91 includes an ROADM device 901 and landing stations 101 to 103. The ROADM device 901 is installed on the seafloor and is connected to the landing stations 101 to 103 installed ashore through optical submarine cables. The ROADM device 901 includes WSSs 131 and 132 and couplers 133 and 134 on uplinks. The ROADM device 901 includes WSSs 141 and 142 and couplers 143 and 144 on downlinks. The ROADM device 901 includes a control circuit 951 for controlling the WSSs 131 and 132 and WSSs 141 and 142.

An operation of the ROADM device 901 will be described with reference to FIG. 12. The WSS 131 separates a signal AB received from the landing station 101 into a signal A and a signal B and outputs the signal A and the signal B. The signal A is output to the coupler 133 and the signal B is output to the coupler 134. The WSS 132 separates a signal A'B' received from the landing station 103 into a signal A' and a signal B' and outputs the signal A' and the signal B'. The signal B' is output to the coupler 133 and the signal A' is output to the coupler 134.

The coupler 133 outputs a signal AB' generated by coupling the signal A and the signal B' to the landing station 102. The coupler 134 outputs a signal A'B generated by coupling the signal A' and the signal B to the landing station 103.

An operation of the ROADM device 901 for optical signals in the down direction is similar to the operation described above. Specifically, the WSS 141 separates a signal DE received from the landing station 102 into a signal D and a signal E and outputs the signal D and the signal E. The WSS 142 separates a signal D'E' received from the landing station 103 into a signal D' and a signal E' and outputs the signal D' and the signal E'. The coupler 143 outputs a signal DE' generated by coupling the signal D and the signal E' to the landing station 101. The coupler 144 outputs a signal D'E generated by coupling the signal D' and the signal E to the landing station 103. In this way, in the ROADM device 901, the signal A'B and the signal D'E are transmitted to the landing station 103.

FIG. 13 is a diagram illustrating an example of wavelength bands of optical signals input and output at the ROADM device 901. In the ROADM device 900, a signal A directed to the landing station 102 and a signal D directed to the landing station 101 are also transmitted to the landing station 103. In the ROADM device 901, signals received at the landing station 103 from the uplink and the downlink are a signal A'B and a signal D'E, respectively. These WDM signals do not include the signal A directed to the landing station 102 and the signal D directed to the landing station 101. The ROADM device 901 can therefore prevent the signal A and the signal D from being picked up at the landing station 103.

CITATION LIST

Patent Literature

[PTL 1] Japanese Laid-open Patent Publication No. 2010-098545 (Paragraph [0019], FIG. 2)
[PTL 2] Japanese Laid-open Patent Publication No. 2011-109173 (Paragraph [0016], FIG. 4)

SUMMARY OF INVENTION

Technical Problem

A wavelength selective device such as WSS is made up of a plurality of optical components and is used by being connected to a control circuit and a power supply. Examples of the optical components include micro electro mechanical systems (MEMS), liquid crystal on silicon (LCOS), optical filters, and lenses. MEMS and LCOS are wavelength selective elements that switch optical paths and wavelengths. An optical filter passes or blocks an optical signal having a specific wavelength. A lens optically couples a wavelength selective element and an optical filter with a fiber. The wavelength selective element is controlled by using an electrical signal from a control circuit. While a WSS device is made up of such various types of components as described above, the WSS device needs to be highly reliable in order to be used in a backbone communication system. Since an optical submarine cable system is required to have reliability enough to operate with stability for a long period of time, for example, 25 years, especially high reliability is required for an ROADM device which uses WSSs. In PTL 1 and PTL 2, however, no mention is made of a specific configuration for improving reliability of a ROADM device when using WSSs.

Object of Invention

An object of the present invention is to provide a technique for implementing a highly reliable ROADM device.

Solution to Problem

An optical multiplexing and demultiplexing device according to the present invention includes: a first wavelength selective switch that multiplexes by wavelength and outputs optical signals included in a first wavelength multiplexed optical signal; a second wavelength selective switch that multiplexes by wavelength and outputs optical signals included in a second wavelength multiplexed optical signal; an optical switch that outputs a first wavelength multiplexed signal and a second wavelength multiplexed signal to the first wavelength selective switch or the second wavelength selective switch, based on states of the first wavelength selective switch and the second wavelength selective switch; and a first coupler that couples an output of the first wavelength selective switch and an output of the second wavelength selective switch.

An optical multiplexing and demultiplexing device according to the present invention includes: a first coupler and a second coupler that couple and output optical signals;

a first wavelength selective switch that demultiplexes by wavelength and outputs optical signals included in a first wavelength multiplexed signal to the first and second couplers; a second wavelength selective switch that demultiplexes by wavelength and outputs optical signals included in a second wavelength multiplexed signal to the first and second couplers; a third wavelength selective switch that demultiplexes by wavelength and outputs optical signals included in a third wavelength multiplexed signal to the first and second couplers; and an optical switch that, based on states of the first and second wavelength selective switches, performs control in such a way as to input the first wavelength multiplexed signal into the first wavelength selective switch or input the first wavelength multiplexed signal into the third wavelength selective switch as the third wavelength multiplexed signal, and input the second wavelength multiplexed signal into the second wavelength selective switch or input the second wavelength multiplexed signal into the third wavelength selective switch as the third wavelength multiplexed signal.

A method of controlling an optical multiplexing and demultiplexing device according to the present invention includes: by a first wavelength selective switch, multiplexing by wavelength and outputting optical signals included in a first wavelength multiplexed optical signal; by a second wavelength selective switch, multiplexing by wavelength and outputting optical signals included in a second wavelength multiplexed optical signal; based on states of the first wavelength selective switch and the second wavelength selective switch, outputting a first wavelength multiplexed signal and a second wavelength multiplexed signal to the first wavelength selective switch or the second wavelength selective switch; and coupling an output of the first wavelength selective switch and an output of the second wavelength selective switch.

Advantageous Effects of Invention

The present invention has an advantageous effect of enabling implementation of a highly reliable ROADM device.

BRIEF DESCRIPTION OF DRAWINGS

FIG. 13 is a diagram illustrating example wavelength bands of optical signals input and output at an ROADM device 901.

DESCRIPTION OF EMBODIMENTS

General Description of Example Embodiments

In the following description of example embodiments, embodiments will be described in which the present invention is applied to a reconfigurable optical add/drop multiplexing (ROADM) device that includes wavelength selective switches (WSSs) and is used in an optical submarine cable system. The ROADM device in each of the example embodiments includes a backup WSS. In the event of a failure of a WSS being used, the ROADM device uses the backup WSS to maintain communication with landing stations.

If a currently used WSS fails, the ROADM device uses an optical switch to switch the path of an optical signal input into the failed WSS in such a way that the optical signal is input into a backup WSS. After the switching, WDM signals to be separately transmitted to a trunk station and a branch station are generated using the backup WSS and a coupler. A control circuit stops power supply to an unused WSS (that is, a WSS in which no optical signal is input).

First Example Embodiment

Figure 1:
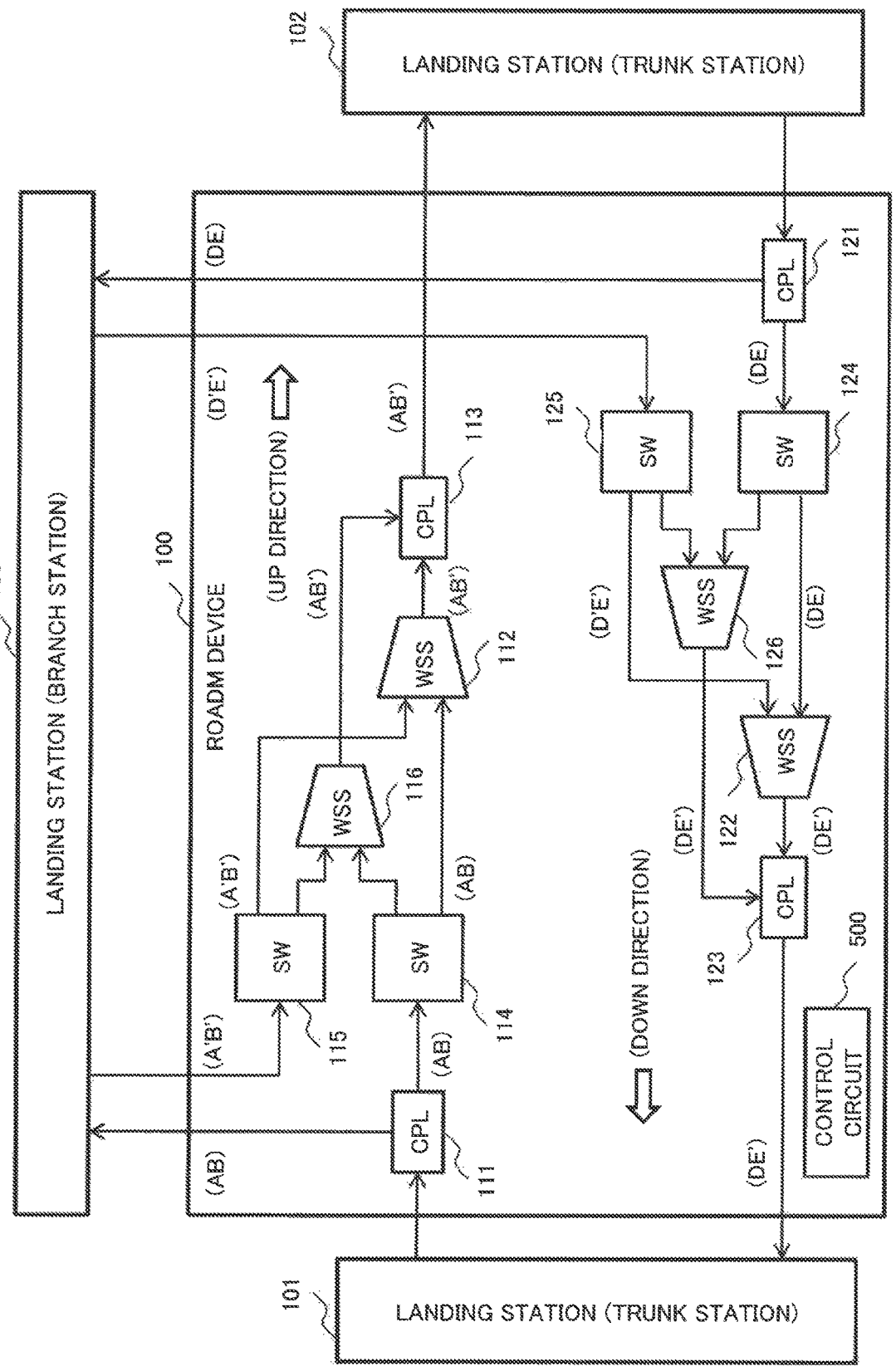
FIG. 1 is a block diagram illustrating an example configuration of an optical submarine cable system 10 of a first example embodiment.

FIG. 1 is a block diagram illustrating an example configuration of an optical submarine cable system 10 of a first example embodiment of the present invention. The optical submarine cable system 10 includes an ROADM device 100 and landing stations 101 to 103. The landing stations 101 to 103 and the ROADM device 100 are coupled through optical submarine cables. The landing stations 101 to 103 are terminal stations that terminate optical submarine cables. The landing stations 101 and 102 are also referred to as trunk stations. The landing station 103 is also referred to as a branch station. Wavelength division multiplexing (WDM) signals are transmitted between the landing stations 101 to 103 and the ROADM device 100 through the optical submarine cables. In the following description of drawings, components that have been already mentioned above will be given like names and reference symbols and repeated description thereof will be omitted.

Figure 10:
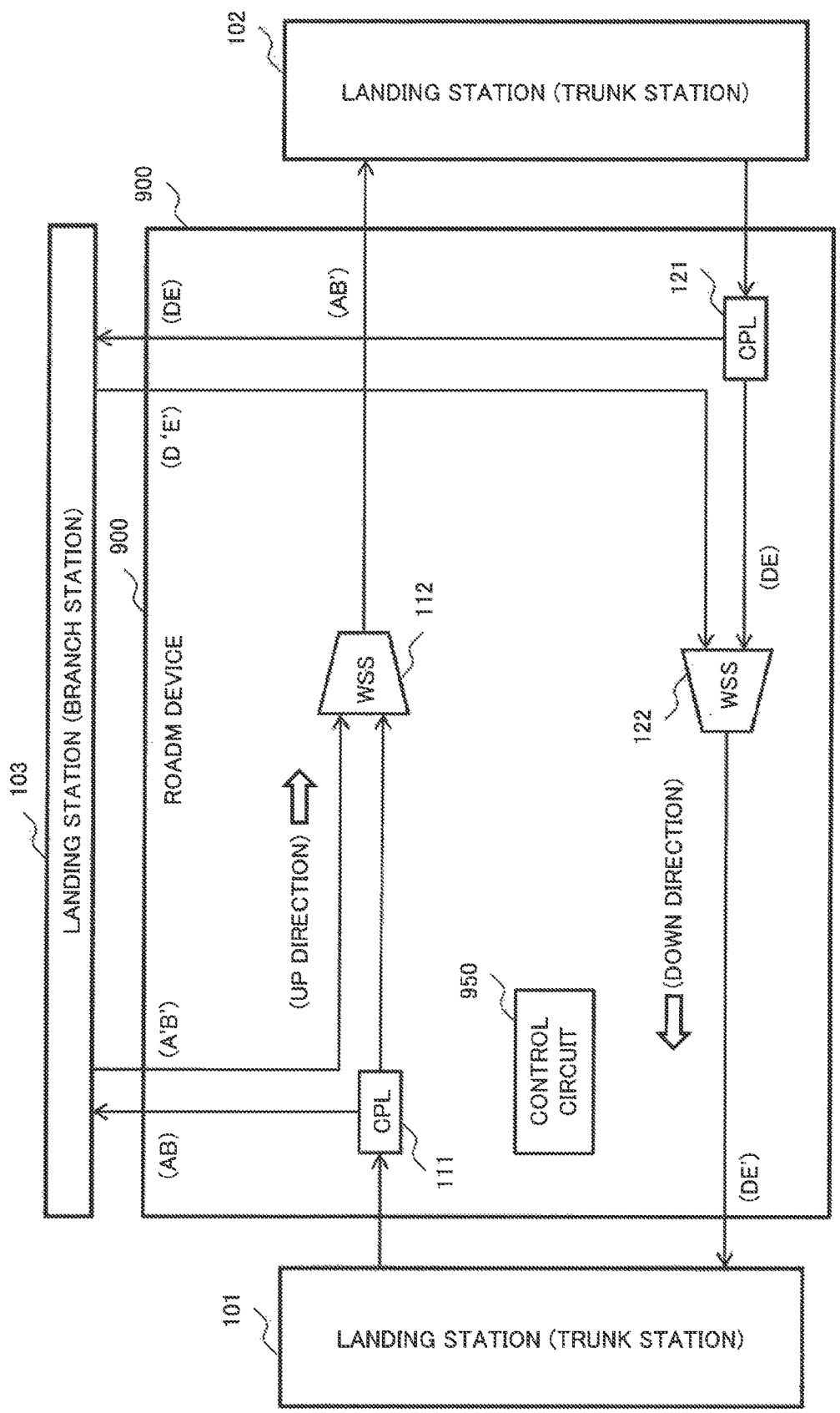
FIG. 10 is a block diagram illustrating a configuration of a conventional optical submarine cable system 90.

Compared with the ROADM device 900 described in FIG. 10, the ROADM device 100 further includes couplers 113 and 123, optical switches 114, 115, 124 and 125, and WSSs 116 and 126. The optical switches 114 and 115, the WSS 116, and the coupler 113 are provided along an uplink. The optical switches 124 and 125, the WSS 126 and the coupler 123 are provided along a downlink. Each of the optical switches is a 1×2 optical switch and outputs an input optical signal through one of two outputs.

In the following description, a configuration and operations of the ROADM device 100 in the up direction will be described. A configuration and operations of the couplers 121 and 123, the WSSs 122 and 126, and the optical switches 124 and 125 in the down direction can be considered to be similar to those of the couplers 111 and 113, the WSSs 112 and 116, and the optical switches 114 and 115 in the up direction. Therefore, description of the configuration and operations in the down direction will be omitted.

The coupler 111 splits a WDM signal input from the landing station 101 into two and outputs one to the optical switch 114 and the other to the landing station 103. The optical switch 114 outputs a WDM signal input from the coupler 111 to the WSS 112 or the WSS 116. The optical switch 115 outputs a WDM signal input from the landing station 103 to the WSS 112 or the WSS 116. One of outputs from the optical switch 114 and one of outputs from the optical switch 115 are input into the WSS 112. The other of the outputs from the optical switch 114 and the other of the outputs from the optical switch 115 are input into the WSS 116.

Figure 2:
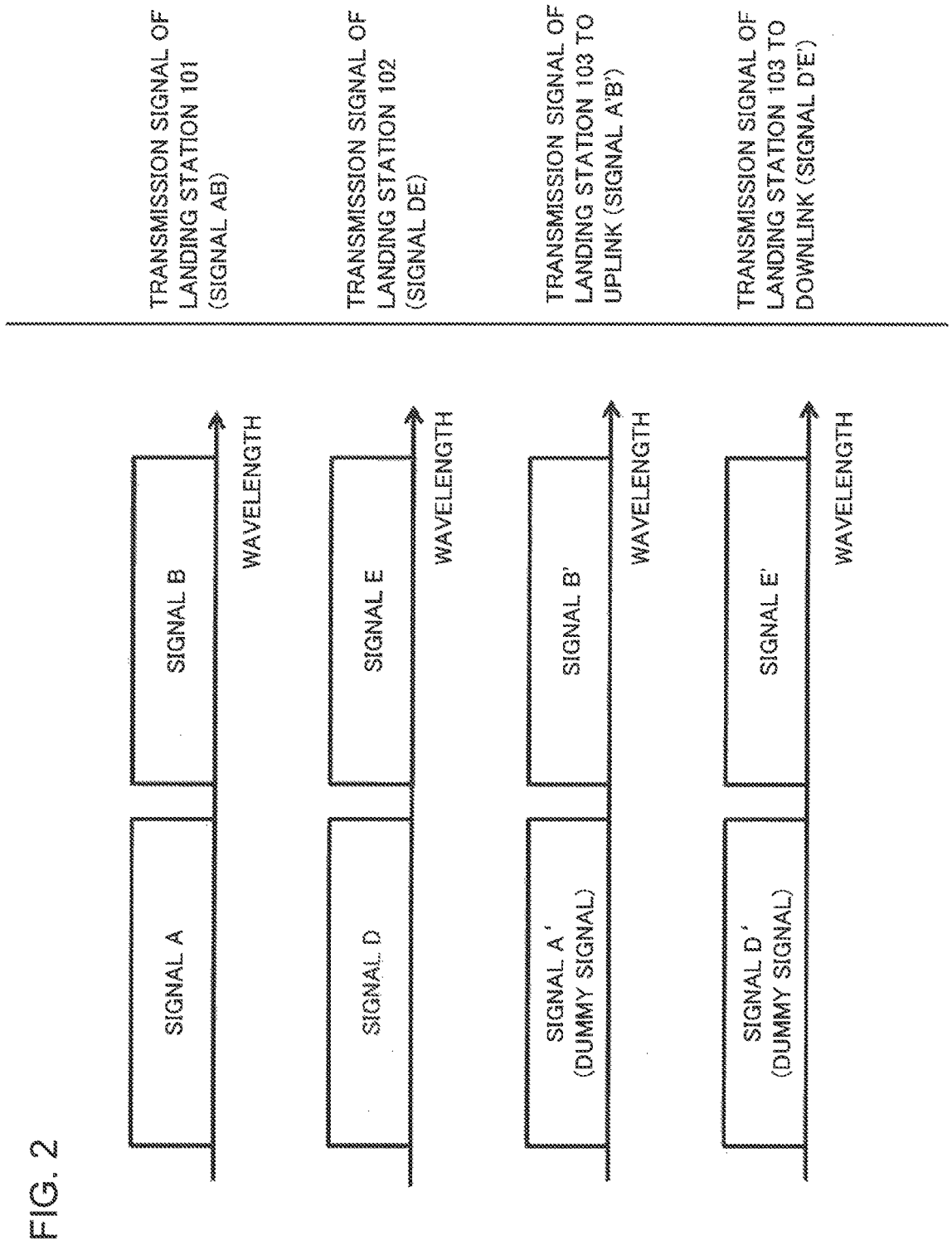
FIG. 2 is a diagram illustrating example wavelength bands of optical signals input and output at an ROADM device 100 of the first example embodiment.
Figure 11:
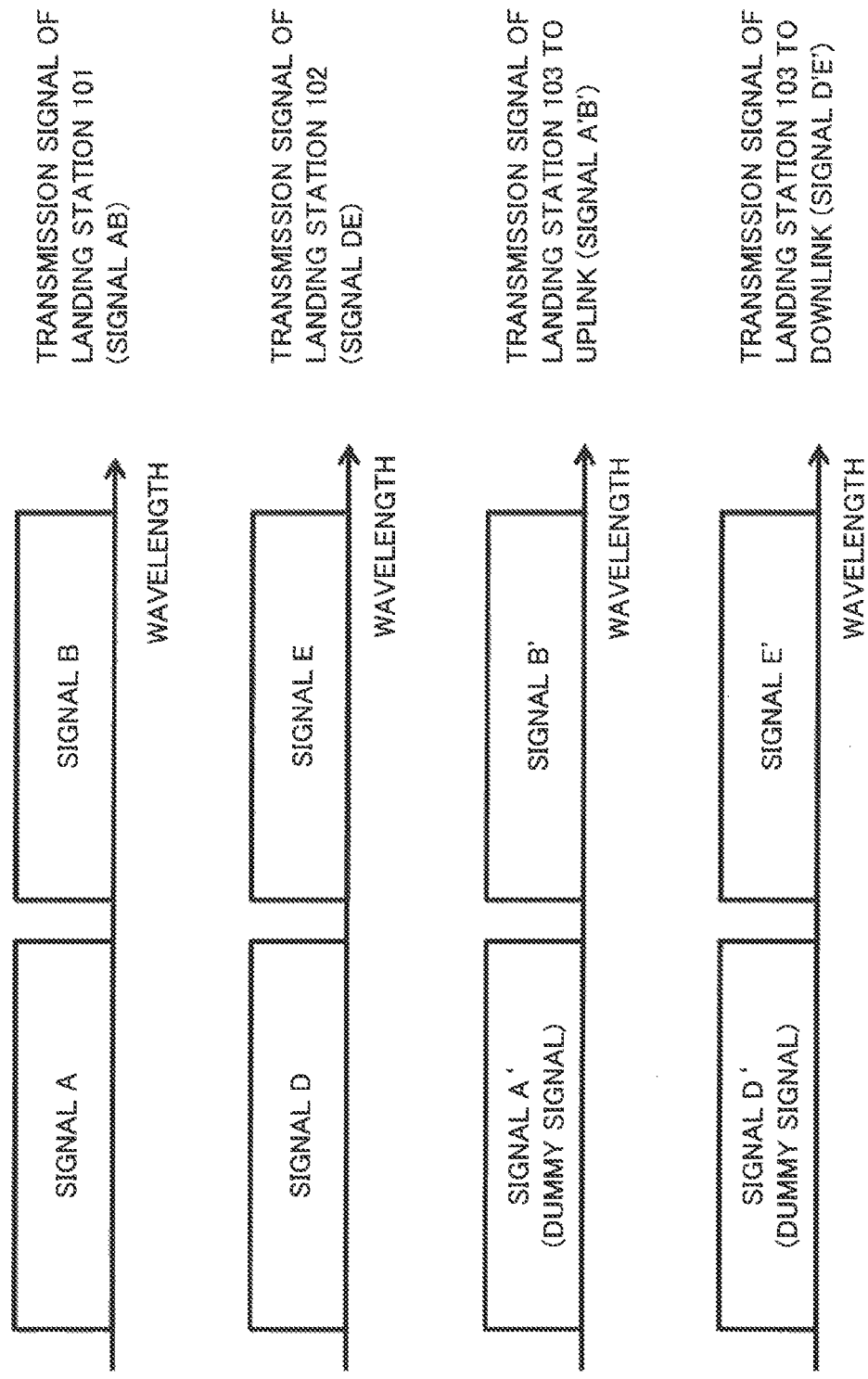
FIG. 11 is a diagram illustrating example wavelength bands of optical signals input and output at an ROADM device 900.

FIG. 2 is a diagram illustrating example wavelength bands of optical signals input and output at the ROADM device 100. The example of the wavelength bands of the optical signals in FIG. 2 are similar to those in FIG. 11. Specifically, a signal A and a signal B are transmission signals of the landing station 101 and a signal D and a signal E are transmission signals of the landing station 102. The signal A is an optical signal transmitted from the landing station 101 to the landing station 102 and the signal B is an optical signal transmitted from the landing station 101 to the landing station 103. The signal D is an optical signal transmitted from the landing station 102 to the landing station 101 and the signal E is an optical signal transmitted from the landing station 102 to the landing station 103.

A signal A' and a signal B' are transmission signals of the landing station 103 to the uplink and a signal D' and a signal E' are transmission signals of the landing station 103 to the downlink. The signal B' is an optical signal transmitted from the landing station 103 to the landing station 102 and the signal E' is an optical signal transmitted from the landing station 103 to the landing station 101. The signal A' and the signal D' are dummy signals. The dummy signals are added at the landing station 103 in order to keep the optical power of WDM signals input into optical submarine repeaters installed along the submarine cables within a given range in a system. The dummy signals do not include information to transmit.

The signal A, the signal A', the signal D, and the signal D' belong to the same waveband and the signal B, the signal B', the signal E, and the signal E' belong to the same waveband. Further, the waveband to which the signal A belongs and the waveband to which the signal B belongs do not overlap. Each of the signals A, A', B, B', D, D', E, and E' may be one carrier (carrier wave) optical signal or may include a plurality of carrier optical signals.

Propagation of WDM signals in the up direction in the ROADM device 100 will now be described with reference to FIG. 1. A signal AB is input from the landing station 101 to the coupler 111. One of two signals into which the signal AB is split by the coupler 111 is input into the optical switch 114. When the WSS 112 is operating normally, the optical switch 114 outputs the input signal AB to the WSS 112. When the WSS 112 fails, the optical switch 114 outputs the input signal AB to the WSS 116.

A signal A'B' output from the landing station 103 is input into the optical switch 115. When the WSS 112 is operating normally, the optical switch 115 outputs the input signal A'B' to the WSS 112. When the WSS 112 fails, the optical switch 115 outputs the input signal A'B' to the WSS 116.

When the signal AB and the signal A'B' are input into the WSS 112, the WSS 112 demultiplexes and multiplexes the signal A and the signal B' into the signal AB' and outputs the signal AB' to the coupler 113. Similarly, when the signal AB and the signal A'B' are input into the WSS 116, the WSS 116 demultiplexes and multiplexes the signal A and the signal B' into the signal AB' and outputs the signal AB' to the coupler 113.

A control circuit 500 is an electrical circuit that monitors and controls the optical switches 114, 115 and WSSs 112, 116. The control circuit 500 collects and holds states of the WSS 112, 116 and controls the WSSs 112, 116 and the optical switches 114, 115 based on states of the WSS 112 and 116. The control circuit 500 similarly controls the optical switches and WSSs in the down direction. Note that the ROADM device 100 may be remotely controlled from the outside. When the optical switches 114 and 115 output WDM signals to the WSS 112, the control circuit 500 supplies power to the WSS 112 and stops supplying power to the WSS 116. When the optical switches 114 and 115 output WDM signals to the WSS 116, the control circuit 500 supplies power to the WSS 116 and stops supplying power to the WSS 112. The control circuit 500 performs similar power control for the WSS 122 and the WSS 126 used on the downlink. Specifically, the control circuit 500 supplies power only to a WSS into which a WDM signal is input and which is operating. Further, the control circuit 500 can change the capacity of transmission to the landing station 102 and the capacity of transmission to the landing station 103 by changing the ratio between the wavelength bandwidths of the signals AB and A'B' at the WSS 112 and the WSS 116.

The couplers 111, 113, 121 and 123 are optical directional couplers, for example. The coupler 113 couples optical signals input from the WSS 112 and WSS 116 and outputs an optical signal to the landing station 102. In effect, the signal AB' from only one of the WSS 112 and WSS 116 is input into the coupler 113 by the operations of the optical switches 114 and 115 described above.

Figure 3:
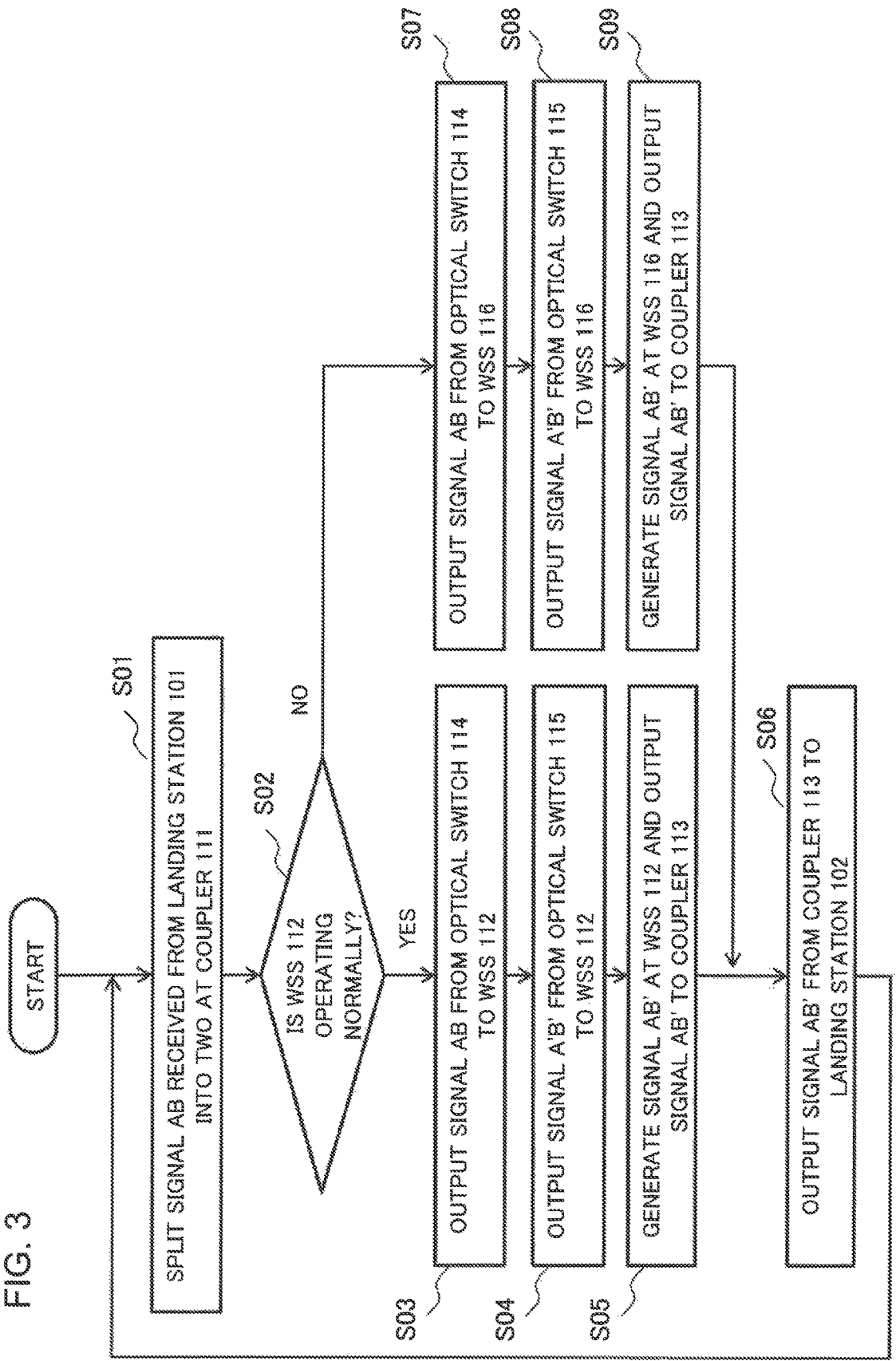
FIG. 3 is a flowchart illustrating an example operation procedure of the ROADM device 100 of the first example embodiment.

FIG. 3 is a flowchart illustrating an example operation procedure of the ROADM device 100 of the first example embodiment. The signal AB received from the landing station 101 is split into two by the coupler 111 (step S01 of FIG. 3). Determination is made as to whether the WSS 112 is operating normally (S02). When the WSS 112 is operating normally (S02: Yes), the signal AB is output from the optical switch 114 to the WSS 112 (S03) and the signal A'B' is output from the optical switch 115 to the WSS 112 (S04). The signal AB' is generated at the WSS 112 and the generated signal AB' is output to the CPL 113 (S05). The signal AB' passes through the coupler 113 and is output to the landing station 102 (S06)

When the WSS 112 is at fail (S02: No), the signal AB is output from the optical switch 114 to the WSS 116 (S07) and the signal A'B' is output from the optical switch 115 to the WSS 116 (S08). It is assumed in this case that the WSS 116 is normal. The signal AB' is generated at the WSS 116 and the generated signal AB' is output to the CPL 113 (S09). The signal AB' passes through the coupler 113 and is output to the landing station 102 (S06), and then step S01 to step S09 are repeated. Note that the descriptions in FIG. 3 do not mean that only one of step S01 to step S09 is performed at a time. More than one steps in the flow of FIG. 3 may be performed at the same time.

In this way, the ROADM device 100 outputs the signal AB' to the landing station 102 regardless of whether the WSS 112 is normal or at fault. Further, operation of the ROADM device 100 for a WDM signal in the down direction can be considered to be similar to the operation in the up direction described above. Specifically, a signal DE' is output to the landing station 101 regardless of whether the WSS 122 is normal or at fault, according to a procedure similar to the procedure in FIG. 3. The control circuit 500 can change the capacity of transmission to the landing station 101 and the capacity of transmission to the landing station 103 by changing the ratio between the wavelength bandwidths of signals DE and D'E' at the WSS 122 and the WSS 126.

As described above, the ROADM device 100 of the first example embodiment continues communication by using the WSS 166 or the WSS 126, which is a backup WSS, when the WSS 112 on the uplink or the WSS 122 on the downlink fails. Consequently, line disconnect or degradation of signal quality of communication between the landing station 101 and the landing station 102, and communication of the landing stations 101 and 102 with the landing station 103 due to a failure of the WSS 112 or the WSS 122 is prevented. In this case, ROADM function is not impaired because the WSS 116 or the WSS 126, which is a backup WSS, is used.

Therefore, the ROADM device 100 of the present example embodiment enables enhancement of reliability of the ROADM device that uses WSSs and consequently enhancement of the reliability of the optical submarine cable system. Further, the control circuit 500 does not supply power to a WSS that is not used. Accordingly, power consumption in the ROADM device 100 does not increase before and after a failure of a WSS. In other words, the ROADM device 100 of the present example embodiment can inhibit an increase in power consumption in the ROADM device.

Variation of First Example Embodiment

The ROADM device 100 of the first example embodiment can also be described as an optical multiplexing and demultiplexing device that includes the following configuration. Corresponding elements in FIG. 1 are given in parentheses. Specifically, the optical multiplexing and demultiplexing device includes a first wavelength selective switch (WSS 112), a second wavelength selective switch (WSS 116), optical switches (optical switches 114 and 115), and a first coupler (coupler 113).

The first wavelength selective switch (WSS 112) multiplexes by wavelength and outputs optical signals included in a first wavelength multiplexed optical signal (signal AB). The second wavelength selective switch (WSS 116) multiplexes by wavelength and outputs optical signals included in a second wavelength multiplexed optical signal (signal A'B').

The optical switches (optical switches 114 and 115) output the first wavelength multiplexed signal (signal AB) and the second wavelength multiplexed signal (signal A'B') to the first wavelength selective switch (WSS 112) or the second wavelength selective switch (WSS 116) based on states of the first wavelength selective switch (WSS 112) and the second wavelength selective switch (WSS 116). The first coupler (coupler 113) couples an output from the first wavelength selective switch (WSS 112) and an output from the second wavelength selective switch (WSS 116).

The optical multiplexing and demultiplexing device of the variation of the first example embodiment that includes the configuration descried above enables enhancement of reliability of the optical multiplexing and demultiplexing device that uses WSSs by substituting function of the WSS 116 for function of the WSS 112 when the WSS 112 fails.

Second Example Embodiment

A second example embodiment will be described next with reference to drawings.

Figure 4:
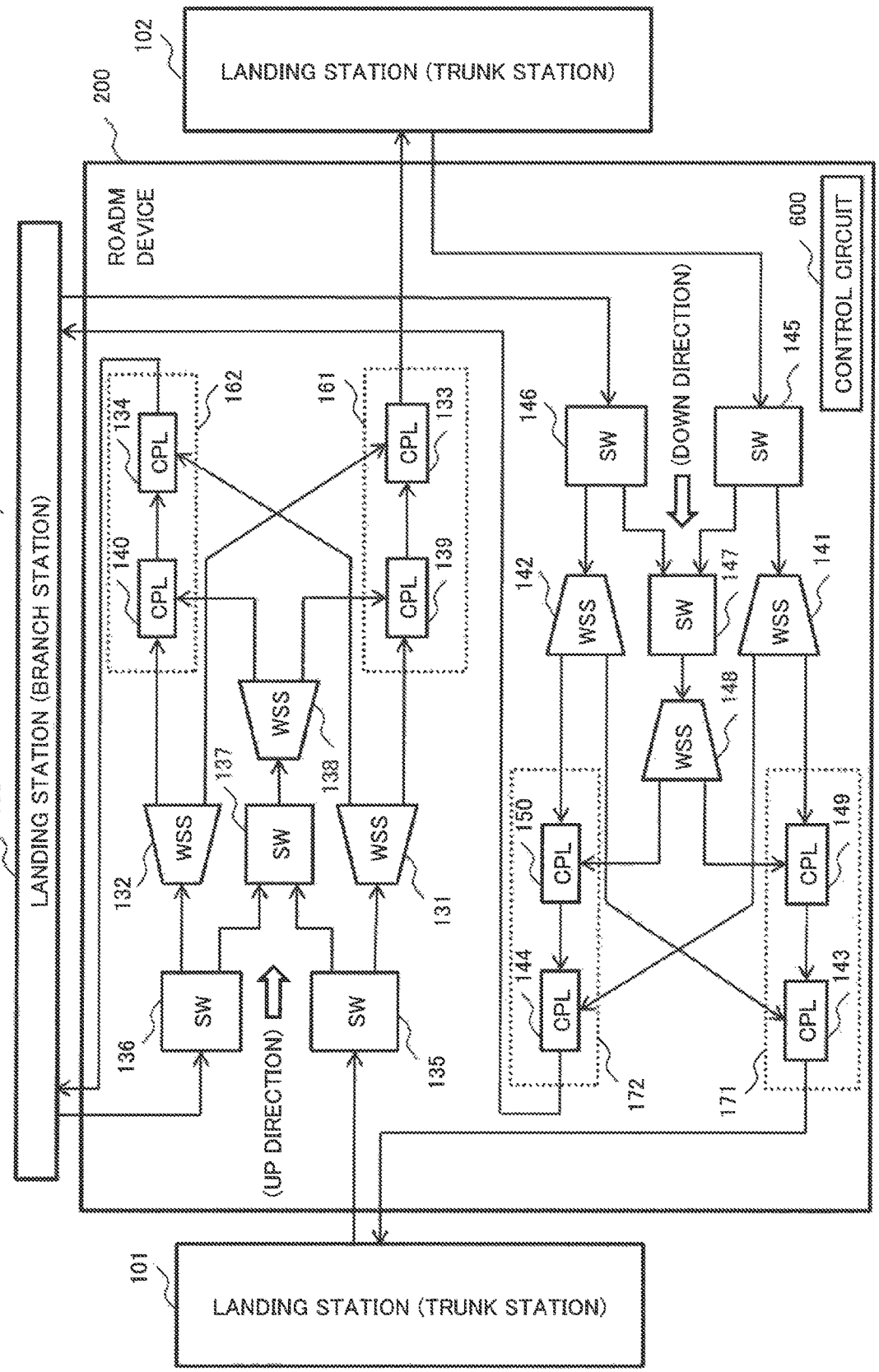
FIG. 4 is a block diagram illustrating an example configuration of an optical submarine cable system 20 of a second example embodiment.
Figure 12:
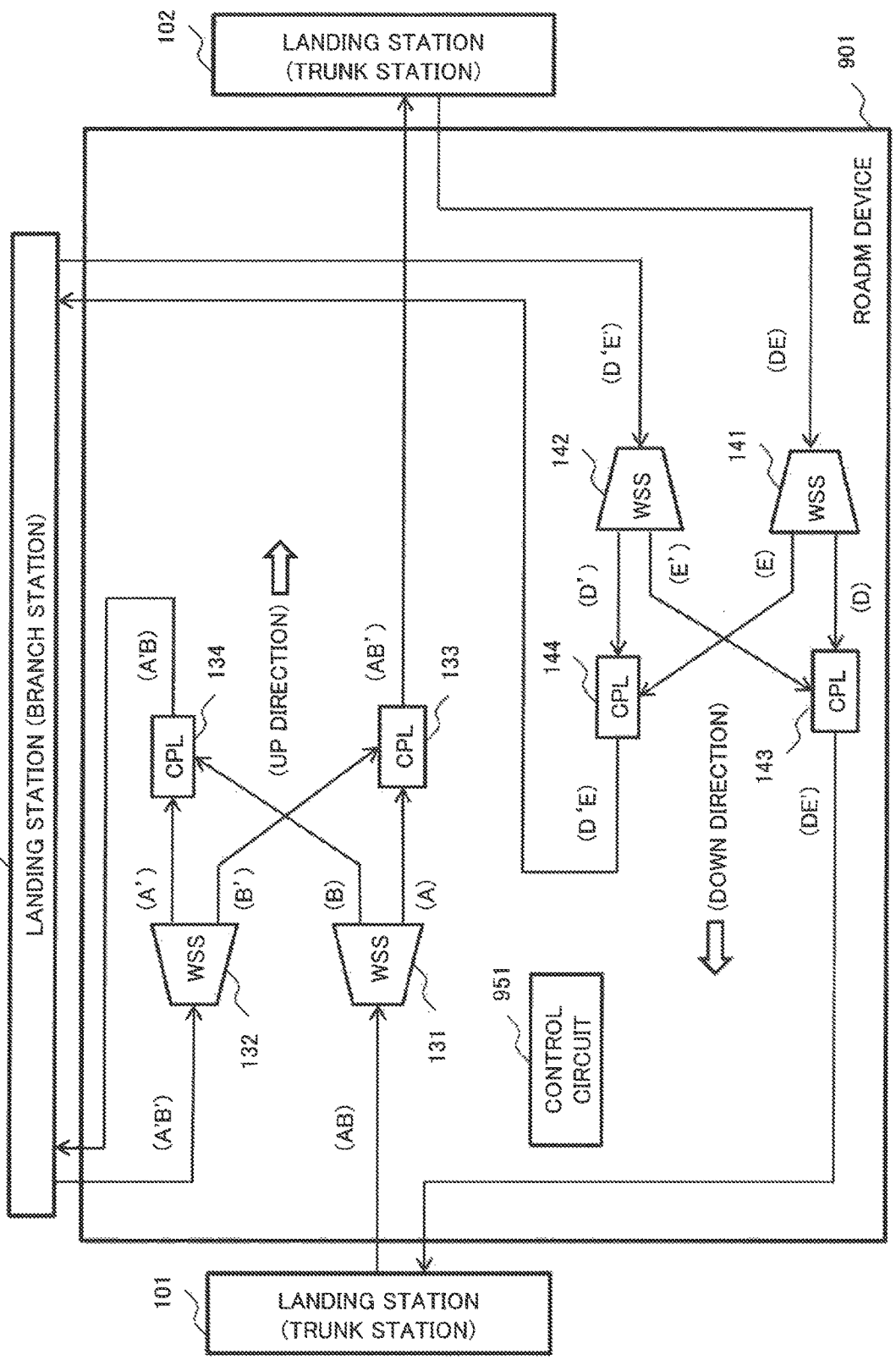
FIG. 12 is a block diagram illustrating a configuration of another conventional optical submarine cable system 91.

FIG. 4 is a block diagram illustrating an example configuration of an optical submarine cable system 20 of a second example embodiment of the present invention. The optical submarine cable system 20 includes an ROADM device 200 and landing stations 101 to 103. The landing stations 101 to 103 and the ROADM device 200 are coupled through optical submarine cables. Compared with the ROADM device 901 described in FIG. 12, the ROADM device 200 further includes optical switches 135 to 137, optical switches 145 to 147, WSSs 138 and 148, and couplers 139, 140, 149 and 150. The optical switches 135 to 137, the WSS 138, and the couplers 139 and 140 are provided on an uplink. The optical switches 145 to 147, the WSS 148 and the couplers 149 and 150 are provided on a downlink.

In the following description, a configuration and operations of the ROADM device 200 in the up direction will be described. Arrangement of optical components in the down direction is symmetrical to that in the up direction with the only difference being wavelength bands. In other words, an operation of the ROADM device 200 for optical signals transmitted in the down direction can be considered to be similar to an operation in the up direction. Therefore, description of the operation in the down direction will be omitted.

The optical switch 135 outputs an input WDM signal to the WSS 131 or the optical switch 137. The WSS 131 separates by wavelength the WDM signal input from the optical switch 135 and outputs separated signals to the coupler 134 and the coupler 139.

The optical switch 136 outputs an input WDM signal to the WSS 132 or the optical switch 137. The WSS 132 separates by wavelength the WDM signal input from the optical switch 136 and outputs separated signal to the coupler 133 and the coupler 140.

The optical switch 137 selects and outputs one of the WDM signal input from the optical switch 135 and the WDM signal input from 136 to the WSS 138. The WSS 138 separates the WDM signal input from the optical switch 137 by wavelength and multiplexes and outputs a multiplexed optical signal to the coupler 139 and the coupler 140.

The couplers 133 and 139 depicted in FIG. 4 can be described as one coupler 161 with three inputs and one output. Similarly, the couplers 134 and 140 can be described as one coupler 162, the couplers 143 and 149 can be described as one coupler 171, and the couplers 144 and 150 can be described as one coupler 172. The coupler 161 couples and outputs optical signals input from the WSSs 131, 132 and 138 to the landing station 102. The coupler 162 couples and outputs optical signals input from the WSSs 131, 132 and 138 to the landing station 103. In other words, two adjacent couplers, such as the couplers 133 and 139, may be integrated into one star coupler.

A control circuit 600 is an electrical circuit that monitors and controls the WSSs 131, 132, 138, 141, 142 and 148, and the optical switches 135 to 137 and 145 to 147. The control circuit 600 collects and holds states of these WSSs, and controls the WSSs and the optical switches provided in the ROADM device 200 based on the states of the WSSs. Note that the ROADM device 200 may be remotely controlled from the outside. The control circuit 600 supplies power only to WSSs that are being used. In other words, the control circuit 600 does not supply power to a WSS that is not in use and a failed WSS. Accordingly, when a WSS to be used is switched to another WSS, power consumption in the ROADM device 200 does not increase before and after the switching.

Figure 5:
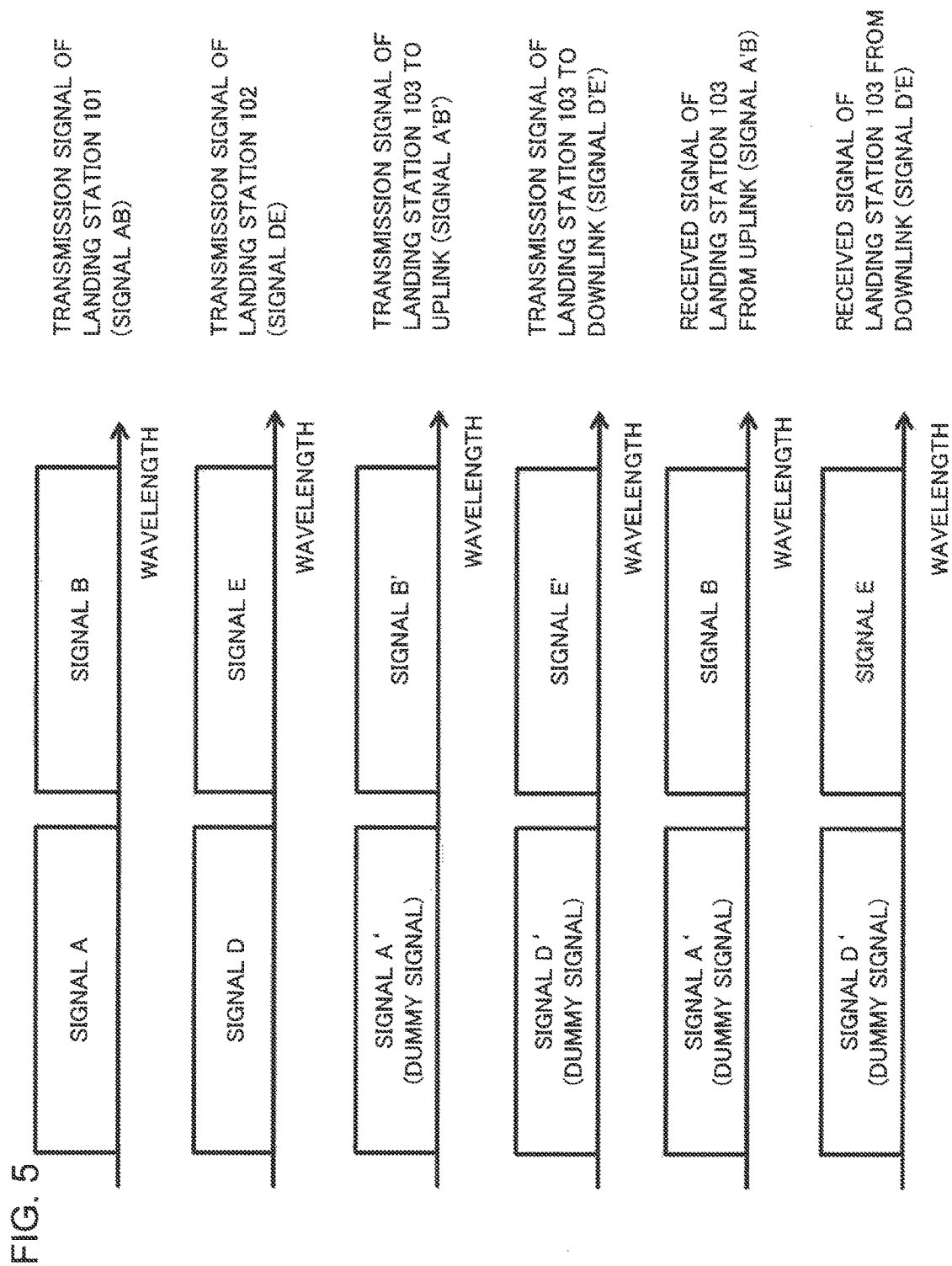
FIG. 5 is a diagram illustrating example wavelength bands of optical signals input and output at an ROADM device 200 of the second example embodiment.

FIG. 5 is a diagram illustrating example wavelength bands of optical signals input and output at the ROADM device 200. The configuration of each of transmission signals of the landing stations 101 and 102 and transmission signals of the landing station 103 to the uplink and the downlink illustrated in FIG. 5 is similar to those in FIG. 13.

In the ROADM device 100 of the first example embodiment, a signal A directed to the landing station 102 and a signal D directed to the landing station 101 are also transmitted to the landing station 103. In the ROADM device 200, signals received at the landing station 103 from the uplink and the downlink are a signal A'B and a signal D'E, respectively, as illustrated in FIG. 5. These WDM signals do not include the signal A directed to the landing station 102 and the signal D directed to the landing station 101. The ROADM device 200 can thus prevent the signal A and the signal D from being picked up at the landing station 103. A specific operation of the ROADM device 200 in the up direction will be described below.

Figure 6:
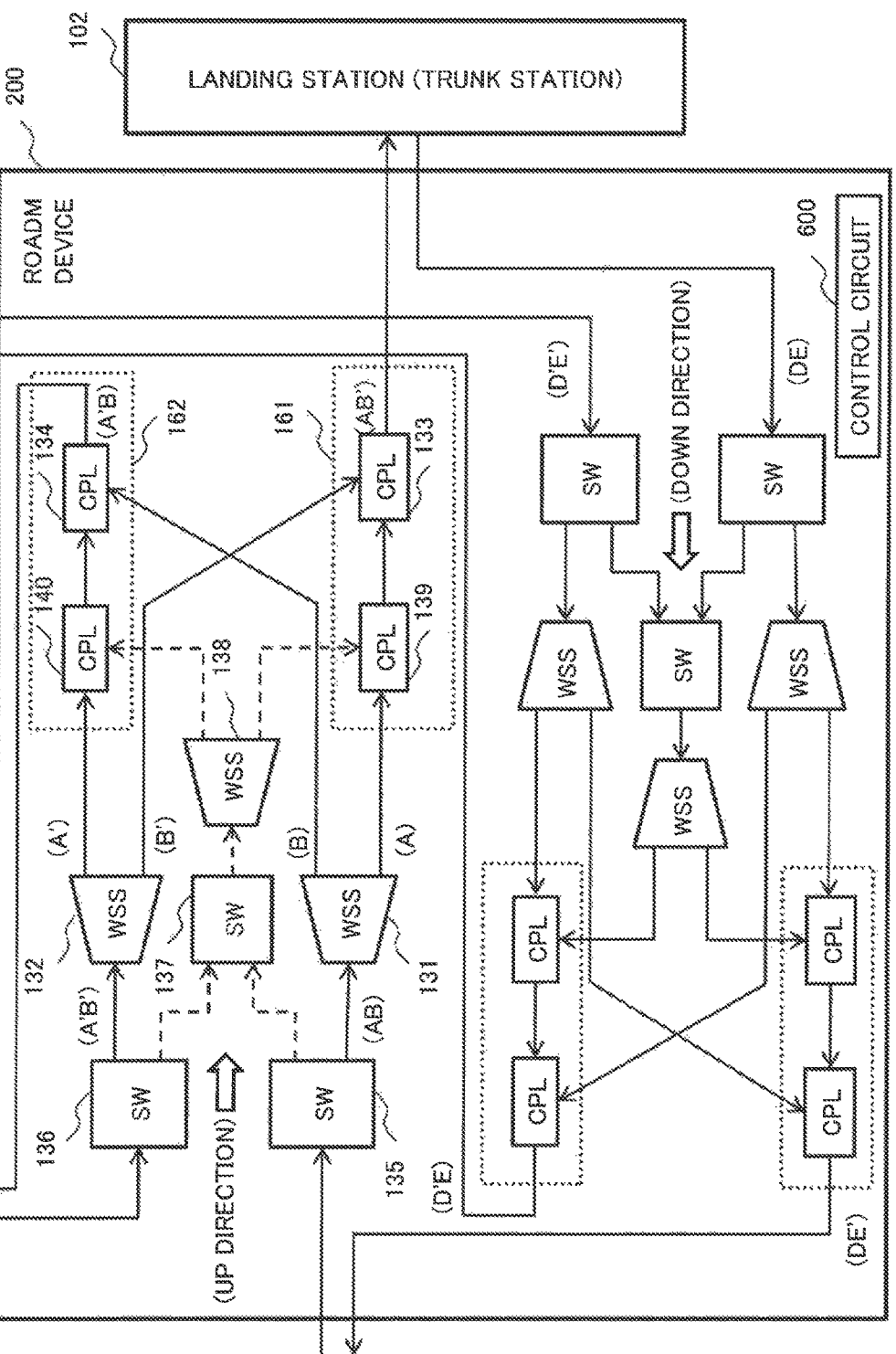
FIG. 6 is a block diagram illustrating an operation of the ROADM device 200 when both of WSSs 131 and 132 are operating normally.
Figure 7:
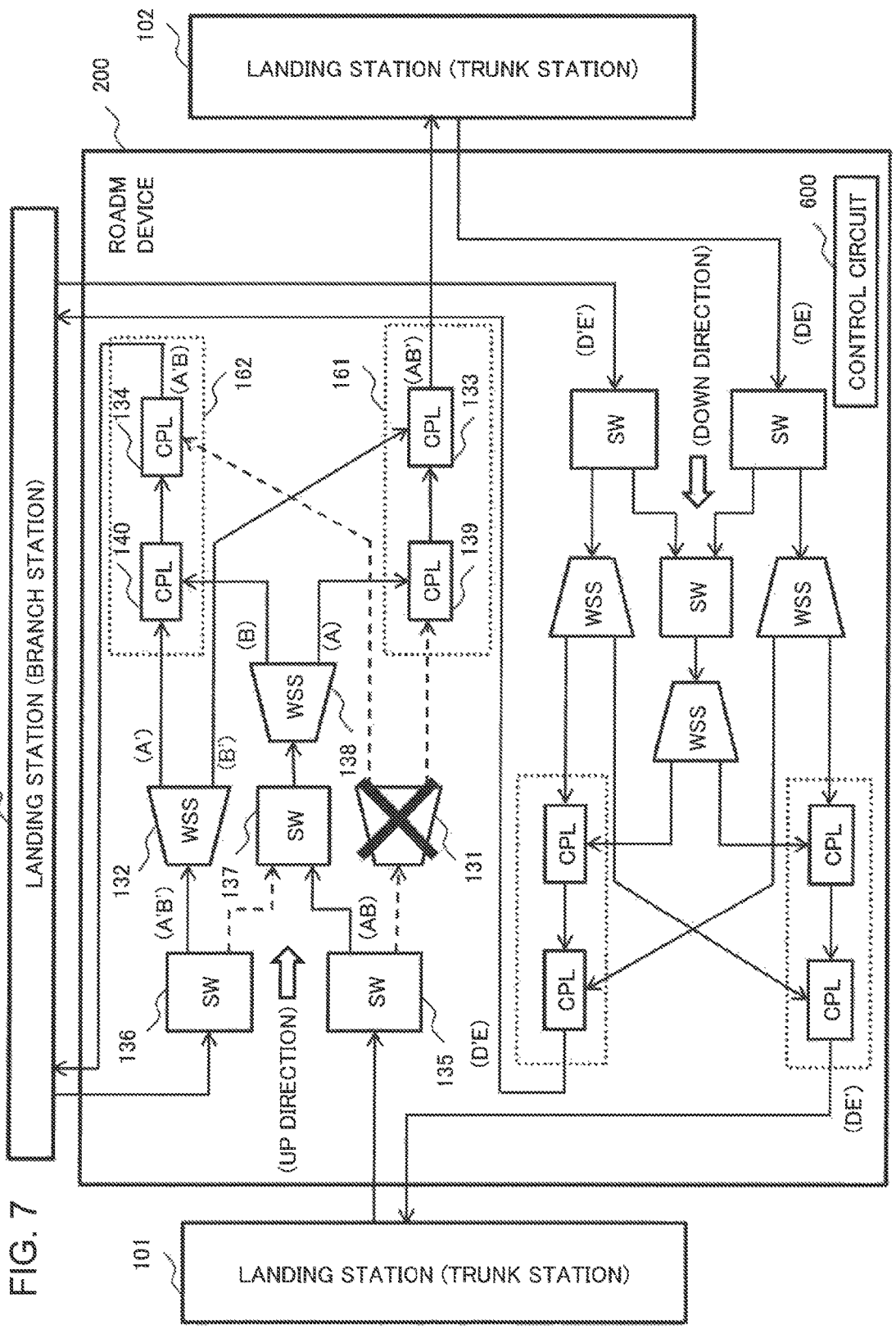
FIG. 7 is a block diagram illustrating an operation of the ROADM device 200 when the WSS 131 is at fault and the WSS 132 is operating normally.
Figure 8:
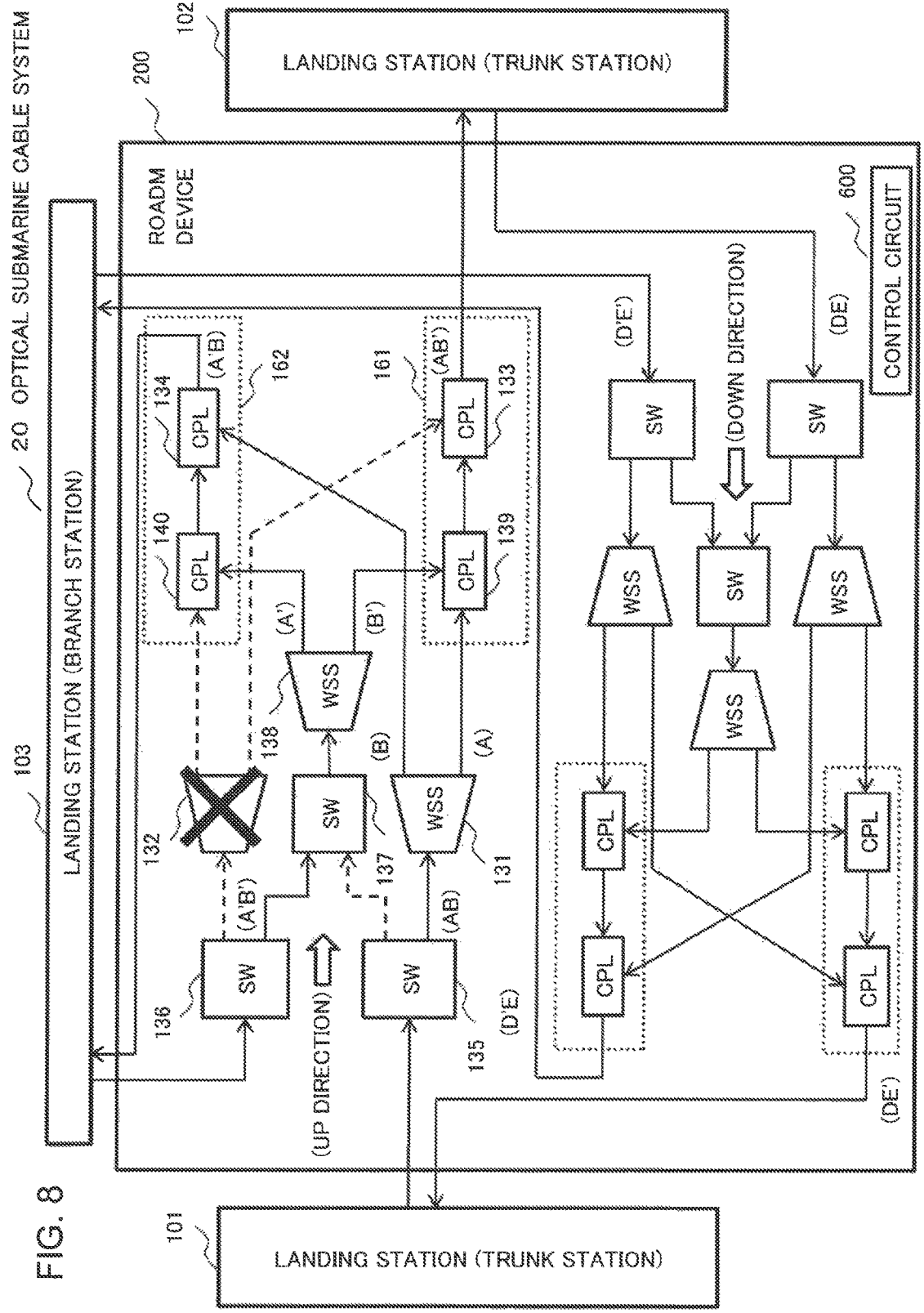
FIG. 8 is a block diagram illustrating an operation of the ROADM device 200 when the WSS 132 is at fault and the WSS 131 is operating normally.

FIG. 6 is a block diagram illustrating an operation of the ROADM DEVICE 200 when both of the WSSs 131 and 132 are operating normally. In FIGS. 6 to 8, optical paths that are not used for transmission of optical signals are indicated by dashed lines. The optical switch 135 in FIG. 6 outputs a signal AB received from the landing station 101 to the WSS 131. The WSS 131 separates the signal AB input from the optical switch 135 by wavelength, outputs a signal B to the coupler 134 and outputs a signal A to the coupler 139. The optical switch 136 outputs a signal A'B' received from the landing station 103 to the WSS 132. The WSS 132 separates the signal A'B' input from the optical switch 136 by wavelength, outputs a signal B' to the coupler 133 and outputs a signal A' to the coupler 140.

When the WSSs 131 and 132 are normal, no WDM signal is input into the WSS 138 and therefore the WSS 138 outputs no optical signal. Accordingly, the signal A output from the WSS 131 simply passes through the coupler 139 and is input into the coupler 133. The coupler 133 couples the signal A output from the WSS 131 and the signal B' output from the WSS 132 to generate a signal AB' and outputs the signal AB' to the landing station 102. Further, a signal A' output from the WSS 132 simply passes through the coupler 140 and is input into the coupler 134. The coupler 134 couples a signal B output from the WSS 131 and the signal A' output from the WSS 132 to generate a signal A'B and outputs the signal A'B to the landing station 103.

FIG. 7 is a block diagram illustrating an operation of the ROADM device 200 when the WSS 131 is at fault and the WSS 132 is operating normally. In FIG. 7, the optical switch 135 outputs a signal AB received from the landing station 101 to the optical switch 137. The optical switch 137 outputs the signal AB input from the optical switch 135 to the WSS 138. The WSS 138 separates the signal AB to generate a signal A and a signal B. The WSS 138 outputs the signal A to the coupler 139 and outputs the signal B to the coupler 140.

The optical switch 136 outputs a signal A'B' received from the landing station 103 to the WSS 132 as in FIG. 6. The WSS 132 separates the signal A'B' input from the optical switch 137 by wavelength, outputs a signal B' to the coupler 133 and outputs a signal A' to the coupler 140.

Since an output of the optical switch 135 is coupled to the optical switch 137, the failed WSS 131 outputs no optical signal. Accordingly, the coupler 139 inputs the signal A output from the WSS 138 into the coupler 133. The coupler 133 couples the signal A input from the coupler 139 and the signal B' output from the WSS 132 to generate a signal AB' and outputs the signal AB' to the landing station 102.

A signal A' output from the WSS 132 is input into the coupler 140. The coupler 140 couples a signal B output from the WSS 138 and the signal A' output from the WSS 132 to generate a signal A'B and outputs the signal A'B to the coupler 134. Since the WSS 131 outputs no optical signal, the coupler 134 outputs the signal A'B input from the coupler 140 to the landing station 103.

FIG. 8 is a block diagram illustrating an operation of the ROADM device 200 when the WSS 132 is at fault and the WSS 131 is operating normally. In FIG. 8, the optical switch 136 outputs a signal A'B' received from the landing station 103 to the optical switch 137. The optical switch 137 outputs the signal A'B' input from the optical switch 136 to the WSS 138. The WSS 138 separates the signal A'B' to generate a signal A' and a signal B'. The WSS 138 outputs the signal B' to the coupler 139 and outputs the signal A' to the coupler 140.

The optical switch 135 outputs a signal AB received from the landing station 101 to the WSS 131 as in FIG. 6. The WSS 131 separates the signal AB input from the optical switch 135 by wavelength, outputs a signal B to the coupler 134 and outputs a signal A to the coupler 139.

Since an output of the optical switch 136 is coupled to the optical switch 137, the failed WSS 132 outputs no optical signal. Accordingly, the coupler 140 inputs a signal A' output from the WSS 138 into the coupler 134. The coupler 134 couples the signal A' input from the coupler 140 and a signal B output from the WSS 131 to generate a signal A'B and outputs the signal A'B to the landing station 103.

A signal A output from the WSS 131 is input into the coupler 139. The coupler 139 couples a signal B' output from the WSS 138 and the signal A output from the WSS 131 to generate a signal AB' and outputs the signal AB' to the coupler 133. Since the WSS 132 outputs no optical signal, the coupler 133 outputs the signal AB' input from the coupler 139 to the landing station 102.

Propagation of WDM signals in the up direction when one of the WSSs 131 and 132 fails has been described above using FIGS. 6 to 8. With the configuration as described above, if one of the WSSs 131 and 132 fails, the ROADM device 200 substitutes function of WSS 138 for the function of the failed WSS. Consequently, if one of the WSSs 131 and 132 fails, the ROADM device 200 can transmit an optical signal in the up direction that is identical to an optical signal that would be transmitted in the case where both of the WSSs 131 and 132 are operating normally. An optical signal transmitted to the landing station 103 does not include a signal A directed to the landing station 102. This means that even if one of the WSSs 131 and 132 fails in the ROADM device 200 of the second example embodiment, signal A directed to the landing the station 102 is kept hidden.

Figure 9:
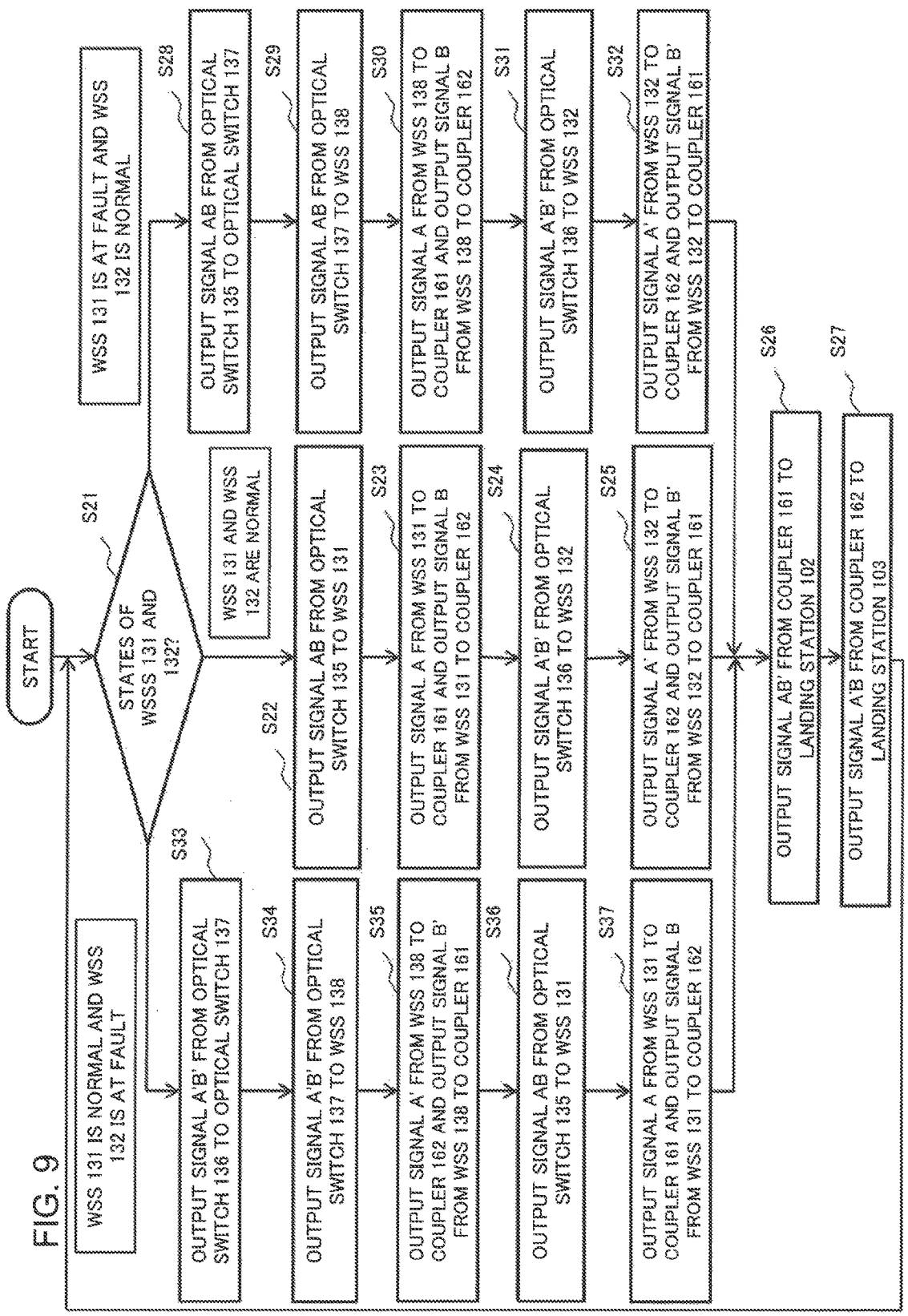
FIG. 9 is a flowchart illustrating an example operation procedure of the ROADM device 200 of the second example embodiment.

FIG. 9 is a flowchart illustrating an example operation procedure of the ROADM device 200 of the second example embodiment. In FIG. 9, the couplers 133 and 139 are depicted as an integrated coupler 161 and the couplers 134 and 140 are depicted as an integrated coupler 162.

First, states of the WSSs 131 and 132 are checked (step S21 of FIG. 9). If both of the WSSs 131 and 132 are normal, the flow branches to step S22. A signal AB received from the landing station 101 is output from the optical switch 135 to the WSS 131 (S22). A signal A is output from the WSS 131 to the coupler 161 and a signal B is output from the WSS 131 to the coupler 162 (S23). On the other hand, a signal A'B' received from the landing station 103 is output from the optical switch 136 to the WSS 132 (S24). A signal A' is output from the WSS 132 to the coupler 162 and a signal B' is output from the WSS 132 to the coupler 161 (S25). A signal AB' generated by coupling the signal A and the signal B' is output from the coupler 161 to the landing station 102 (S26) and a signal A'B generated by coupling the signal B and the signal A' is output from the coupler 162 to the landing station 103 (S27).

When the WSS 131 is at fault and the WSS 132 is normal, the flow branches to S28. A signal AB received from the landing station 101 is output from the optical switch 135 to the optical switch 137 (S28). The signal AB is output from the optical switch 137 to the WSS 138 (S29). A signal A is output from the WSS 138 to the coupler 161 and a signal B is output from the WSS 138 to the coupler 162 (S30). On the other hand, a signal A'B' received from the landing station 103 is output from the optical switch 136 to the WSS 132 (S31). A signal A' is output from the WSS 132 to the coupler 162 and a signal B' is output from the WSS 132 to the coupler 161 (S32). A signal AB' generated by combining the signal A and the signal B' is output from the coupler 161 to the landing station 102 (S26) and a signal A'B generated by coupling the signal B and the signal A' is output from the coupler 162 to the landing station 103 (S27).

When the WSS 131 is normal and the WSS 132 is at fault, the flow branches to step S33. A signal A'B' received from the landing station 102 is output from the optical switch 135 to the optical switch 137 (S33). The signal A'B' is output from the optical switch 137 to the WSS 138 (S34). A signal B' is output from the WSS 138 to the coupler 161 and a signal A' is output from the WSS 138 to the coupler 162 (S35). On the other hand, a signal AB received from the landing station 101 is output from the optical switch 135 to the WSS 131 (S36). A signal A is output from the WSS 131 to the coupler 161 and a signal B is output from the WSS 131 to the coupler 162 (S37). A signal AB' generated by coupling the signal A and the signal B' is output from the coupler 161 to the landing station 102 (S26) and a signal A'B generated by coupling the signal B and the signal A' is output from the coupler 162 to the landing station 103 (S27). Then steps S21 to step S37 are repeated. Note that the descriptions in FIG. 9 do not mean that only one of step S21 to step S37 is performed at a time. More than one steps in the flow of FIG. 9 may be performed at the same time.

Note that if both of the WSSs 131 and 132 fail, both of the optical switches 135 and 136 may output WDM signals (that is, signal AB and signal A'B') to the optical switch 137. In this case, the optical switch 137 may select and output predetermined one WDM signal out of the signal AB and the signal A'B' to the WSS 138. The WSS 138 separates the signal AB into the signal A and the signal B or separate the signal A'B' into the signal A' and the signal B'. Note that the signal A' is a dummy signal. With such operation, at least one of the signal A, the signal B and the signal B' can be transmitted from the WSS 138 to the landing station 102 or 103 even if both of the WSSs 131 and 132 fail.

The configuration and the operation of the ROADM device 200 in the down direction are similar to those described above. Thus, if one of the WSSs 141 and 142 fails, the ROADM device 200 substitutes function of the WSS 148 for function of the failed WSS and accordingly an optical signal that is identical to an optical signal that would be transmitted in the case where both of the WSSs 141 and 142 are operating normally is transmitted in the down direction. In other words, the same effect for a WDM signal in the up direction can be obtained for a WDM signal in the down direction of the ROADM device 200.

As described above, when one of the WSSs 131 and 132 on the uplink fails, the ROADM device 200 of the second example embodiment uses the WSS 138, which is a backup WSS, to continue communication. Similarly, when one of the WSSs 141 and 142 on the downlink fails, the WSS 148, which is a backup WSS, is used to continue communication. Consequently, line disconnect or degradation of signal quality of communications between the landing stations 101 to 103 due to a failure of the WSS 131 or the WSS 132 and a failure of the WSS 141 or 142 is prevented. In this case, ROADM function is not impaired because the WSS 138 and the WSS 148, which are backup WSSs, are used.

Therefore, the ROADM device 200 of the present example embodiment enables enhancement of reliability of the ROADM device that uses WSSs and consequently enhancement of the reliability of the optical submarine cable system.

Further, as in the first example embodiment, the backup WSSs of the ROADM device 200 of the second example embodiment are redundant WSSs that are on cold standby. Accordingly, power consumption in the ROADM device 200 does not increase before and after a failure of a WSS. In other words, the ROADM device 200 of the present example embodiment can inhibit an increase in power consumption in the ROADM device.

Variation of Second Example Embodiment

The ROADM device 200 of the second example embodiment can be described as an optical multiplexing and demultiplexing device including the following configuration. Corresponding elements in FIG. 4 are given in parentheses. Specifically, the optical multiplexing and demultiplexing device includes first and second couplers (coupler 161 and 162), first to third wavelength selective switches (WSS 131, 132 and 138), and optical switches (optical switches 135 to 137).

The first wavelength selective switch (WSS 131) demultiplexes by wavelength and outputs optical signals included in a first wavelength multiplexed signal (signal AB) to the first and second couplers (couplers 161 and 162). The second wavelength selective switch (WSS 132) demultiplexes by wavelength and outputs optical signals included in a second wavelength multiplexed signal (signal A'B') to the first and second couplers (coupler 161 and 162). The third wavelength selective switch (WSS 138) demultiplexes by wavelength and outputs optical signals included in a third wavelength multiplexed signal (signal AB or signal A'B') to the first and second couplers (couplers 161 and 162). The first and second couplers (couplers 161 and 162) couple and output input optical signals.

The optical switches (optical switches 135 to 137) input the first wavelength multiplexed signal (signal AB) to the first wavelength selective switch (WSS 131) or input the first wavelength multiplexed signal (signal AB) as a third wavelength multiplexed signal (signal AB or signal A'B') to the third wavelength selective switch (WSS 138) based on states of the first and second wavelength selective switches (WSSs 131 and 132). Further, the optical switches (optical switches 135 to 137) input the second wavelength multiplexed signal (signal A'B') into the second wavelength selective switch (WSS 132) or input the second wavelength multiplexed signal (signal A'B') as the third wavelength multiplexed signal (signal AB or signal A'B') into the third wavelength selective switch (WSS 138).

The optical multiplexing and demultiplexing device of the variation of the second example embodiment that has the configuration descried above enables enhancement of reliability of the optical multiplexing and demultiplexing device that uses WSSs by substituting function of the WSS 138 for function of a failed WSS when the WSS 131 or WSS 132 fails.

While the present invention has been described with reference to example embodiments, the present invention is not limited to the example embodiments described above. Various modifications that can be understood by those skilled in the art can be made to the configurations and details of the present invention within the scope of the present invention.

The control circuits 500 and 600 described in the descriptions of the first and second example embodiments may include a CPU (central processing unit) and a memory. The memory is a semiconductor memory or a magnetic disk device, for example, and records a program for the CPU. The CPU executes the program stored in the memory to implement functions of the ROADM devices 100 and 200 including WSSs and optical switches.

Example embodiments of the present invention can also be described as, but not limited to, the following supplementary notes.

(Supplementary Note 1)
An optical multiplexing and demultiplexing device including:
a first wavelength selective switch that multiplexes by wavelength and outputs optical signals included in a first wavelength multiplexed optical signal;
a second wavelength selective switch that multiplexes by wavelength and outputs optical signals included in a second wavelength multiplexed optical signal;
an optical switch that outputs a first wavelength multiplexed signal and a second wavelength multiplexed signal to the first wavelength selective switch or the second wavelength selective switch based on states of the first wavelength selective switch and the second wavelength selective switch; and
a first coupler that couples an output of the first wavelength selective switch and an output of the second wavelength selective switch.

(Supplementary Note 2)
The optical multiplexing and demultiplexing device according to supplementary note 1,
wherein the optical switch
outputs the first and second wavelength multiplexed signals to the first wavelength selective switch when the first wavelength selective switch is normal, and
outputs the first and second wavelength multiplexed signals to the second wavelength selective switch when the first wavelength selective switch is at fault and the second wavelength selective switch is normal.

(Supplementary Note 3)
The optical multiplexing and demultiplexing device according to supplementary note 1 or 2,
wherein the first wavelength multiplexed optical signal includes a first optical signal having a first wavelength and a second optical signal having a second wavelength;
the second wavelength multiplexed optical signal includes a third optical signal having the first wavelength and a fourth optical signal having the second wavelength; and
the first and second wavelength selective switches output an optical signal generated by multiplexing the first optical signal and the fourth optical signal.

(Supplementary Note 4)
The optical multiplexing and demultiplexing device according to any one of supplementary notes 1 to 3, further including a control circuit that supplies power only to the first wavelength selective switch or the second wavelength selective switch into which the first and second wavelength multiplexed signals are input.

(Supplementary Note 5)
The optical multiplexing and demultiplexing device according to any one of supplementary notes 1 to 4, further including a second coupler that splits the input first wavelength multiplexed signal into two, wherein the second coupler inputs one of the split first wavelength multiplexed signals into the optical switch and outputs the other of the split first wavelength multiplexed signals.

(Supplementary Note 6)
An optical communication system including an optical multiplexing and demultiplexing device according to supplementary note 5 and first to third terminal stations communicatively coupled to the optical multiplexing and demultiplexing device, the optical communication system being configured in such a way that:
a first wavelength multiplexed signal transmitted by the first terminal station is input into the second coupler;
the other of the first wavelength multiplexed signal branched at the second coupler is output to the third terminal station; and an output of the first coupler is received at the second terminal station.

(Supplementary Note 7)
An optical communication system including two optical multiplexing and demultiplexing devices according to supplementary note 5 as a first optical multiplexing and demultiplexing device and a second optical multiplexing and demultiplexing device and further including first to third terminal stations communicatively coupled to the first and second optical multiplexing and demultiplexing devices, the optical communication system being configured in such a way that:
a first wavelength multiplexed signal transmitted by the first terminal station is input into the second coupler of the first optical multiplexing and demultiplexing device and a first wavelength multiplexed signal transmitted by the second terminal station is input into the second coupler of the second optical multiplexing and demultiplexing device;
the other first wavelength multiplexed signal split at the second coupler of the first optical multiplexing and demultiplexing device is output to the third terminal station and the other first wavelength multiplexed signal split at the second coupler of the second optical multiplexing and demultiplexing device is input into the third terminal station; and
an output of a first coupler of the first optical multiplexing and demultiplexing device is received at the second terminal station and an output of a first coupler of the second optical multiplexing and demultiplexing device is received at the first terminal station.

(Supplementary Note 8)

An optical multiplexing and demultiplexing device including:

a first coupler and a second coupler that couple and output optical signals;

a first wavelength selective switch that demultiplexes by wavelength and outputs optical signals included in a first wavelength multiplexed signal to the first and second couplers;

a second wavelength selective switch that demultiplexes by wavelength and outputs optical signals included in a second wavelength multiplexed signal to the first and second couplers;

a third wavelength selective switch that demultiplexes by wavelength and outputs optical signals included in a third wavelength multiplexed signal to the first and second couplers; and an optical switch that, based on states of the first and second wavelength selective switches, performs control in such a way as to input the first wavelength multiplexed signal into the first wavelength selective switch or input the first wavelength multiplexed signal into the third wavelength selective switch as the third wavelength multiplexed signal, and input the second wavelength multiplexed signal into the second wavelength selective switch or input the second wavelength multiplexed signal into the third wavelength selective switch as the third wavelength multiplexed signal.

(Supplementary Note 9)

The optical multiplexing and demultiplexing device according to supplementary note 8, wherein the optical switch outputs the first wavelength multiplexed signal to the first wavelength selective switch and outputs the second wavelength multiplexed signal to the second wavelength selective switch when both of the first wavelength selective switch and the second wavelength selective switch are normal, outputs the first wavelength multiplexed signal to the third wavelength selective switch and outputs the second wavelength multiplexed signal to the second wavelength selective switch when the first wavelength selective switch is at fault and the second wavelength selective switch is normal, and outputs the second wavelength multiplexed signal to the third wavelength selective switch and outputs the first wavelength multiplexed signal to the first wavelength selective switch when the second wavelength selective switch is at fault and the first wavelength selective switch is normal.

(Supplementary Note 10)

The optical multiplexing and demultiplexing device according to supplementary note 8 or 9, wherein a first wavelength multiplexed optical signal includes a first optical signal having a first wavelength and a second optical signal having a second wavelength;

a second wavelength multiplexed optical signal includes a third optical signal having the first wavelength and a fourth optical signal having the second wavelength;

the first wavelength selective switch outputs the first optical signal to the first coupler and outputs the second optical signal to the second coupler;

the second wavelength selective switch outputs the third optical signal to the second coupler and outputs the fourth optical signal to the first coupler; and the third wavelength selective switch outputs the first optical signal or the fourth optical signal to the first coupler and outputs the second optical signal or the third optical signal to the second coupler.

(Supplementary Note 11)

The optical multiplexing and demultiplexing device according to any one of supplementary notes 8 to 10, including a control circuit that supplies power only to any one of the first to third wavelength selective switches into which the first wavelength multiplexed signal or the second wavelength multiplexed signal is input.

(Supplementary Note 12)

An optical communication system including an optical multiplexing and demultiplexing device according to any one of supplementary notes 8 to 11 and first to third terminal stations communicatively coupled to the optical multiplexing and demultiplexing device, the optical communication system being configured in such a way that:

the first terminal station transmits a first wavelength multiplexed signal to the optical switch;

the second terminal station receives an output of the first coupler; and the third terminal station transmits a second wavelength multiplexed signal to the optical switch and receives an output of the second coupler.

(Supplementary Note 13)

An optical communication system including two optical multiplexing and demultiplexing devices according to any one of supplementary notes 8 to 11 as a first optical multiplexing and demultiplexing device and a second multiplexing and demultiplexing device and further including first to third terminal stations communicatively coupled to the first and second optical multiplexing and demultiplexing devices, the optical communication system being configured in such a way that:

the first terminal station transmits a first wavelength multiplexed signal to the optical switch of the first optical multiplexing and demultiplexing device and the second terminal station transmits a first wavelength multiplexed signal to the optical switch of the second optical multiplexing and demultiplexing device;

the second terminal station receives an output of the first coupler of the first optical multiplexing and demultiplexing device and the first terminal station receives an output of the first coupler of the second optical multiplexing and demultiplexing device; and the third terminal station transmits a second wavelength multiplexed signal to the optical switch of the first optical multiplexing and demultiplexing device, transmits another second wavelength multiplexed signal to the optical switch of the second optical multiplexing and demultiplexing device, and receives an output of the second coupler of the first optical multiplexing and demultiplexing device and an output of the second coupler of the second optical multiplexing and demultiplexing device.

(Supplementary Note 14)

A method of controlling an optical multiplexing and demultiplexing device, the method including:

by a first wavelength selective switch, multiplexing by wavelength and outputting optical signals included in a first wavelength multiplexed optical signal;

by a second wavelength selective switch, multiplexing by wavelength and outputting optical signals included in a second wavelength multiplexed optical signal;

based on states of the first wavelength selective switch and the second wavelength selective switch, outputting a first wavelength multiplexed signal and a second wavelength multiplexed signal to the first wavelength selective switch or the second wavelength selective switch; and coupling an output of the first wavelength selective switch and an output of the second wavelength selective switch.

(Supplementary Note 15)

A method of controlling an optical multiplexing and demultiplexing device, the method including:

by a first wavelength selective switch, demultiplexing by wavelength and outputting optical signals included in a first wavelength multiplexed signal to a first coupler and a second coupler;

by a second wavelength selective switch, demultiplexing by wavelength and outputting optical signals included in a second wavelength multiplexed signal to the first and second couplers;

by a third wavelength selective switch, demultiplexing by wavelength and outputting optical signals included in a third wavelength multiplexed signal to the first and second couplers;

based on states of the first and second wavelength selective switches, performing control in such a way as to input the first wavelength multiplexed signal into the first wavelength selective switch or the third wavelength selective switch and input the second wavelength multiplexed signal into the second wavelength selective switch or the third wavelength to selective switch; and at the first and second couplers, coupling and outputting input optical signals.

(Supplementary Note 16)

A control program of an optical multiplexing and demultiplexing device for causing a computer of the optical multiplexing and demultiplexing device to perform the procedures of:

by a first wavelength selective switch, multiplexing by wavelength and outputting optical signals included in a first wavelength multiplexed optical signal;

by a second wavelength selective switch, multiplexing by wavelength and outputting optical signals included in a second wavelength multiplexed optical signal;

based on states of the first wavelength selective switch and the second wavelength selective switch, outputting a first wavelength multiplexed signal and a second wavelength multiplexed signal to the first wavelength selective switch or the second wavelength selective switch; and coupling an output of the first wavelength selective switch and an output of the second wavelength selective switch.

(Supplementary Note 17)

A control program of an optical multiplexing and demultiplexing device for causing a computer of the optical multiplexing and demultiplexing device to perform the procedures of:

by a first wavelength selective switch, demultiplexing by wavelength and outputting optical signals included in a first wavelength multiplexed signal to a first coupler and a second coupler;

by a second wavelength selective switch, demultiplexing by wavelength and outputting optical signals included in a second wavelength multiplexed signal to the first and second couplers;

by a third wavelength selective switch, demultiplexing by wavelength and outputting optical signals included in a third wavelength multiplexed signal to the first and second couplers; and based on states of the first and second wavelength selective switches, performing control in such a way as to input the first wavelength multiplexed signal into the first wavelength selective switch or the third wavelength selective switch and input the second wavelength multiplexed signal into the second wavelength selective switch or the third wavelength selective switch; and at the first and second couplers, coupling and outputting input optical signals.

This application is based upon and claims the benefit of priority from Japanese Patent Application No. 2015-059061, filed on Mar. 23, 2015, the entire disclosure of which is incorporated herein.

REFERENCE SIGNS LIST

10, 20, 90, 91 Optical submarine cable system
100, 200, 900, 901 ROADM device
101, 102, 103 Landing station
111, 113, 121, 123, 133, 134, 139, 140, 143, 144, 149, 150, 161, 162, 171, 172 Coupler
114, 115, 124, 125, 135 to 137, 145 to 147 Optical switch
112, 116, 122, 126, 131, 132, 138, 141, 142, 148 WSS
500, 600, 950, 951 Control circuit

The invention claimed is:

1. An optical multiplexing and demultiplexing device comprising:

a first wavelength selector configured to multiplex by wavelength and output optical signals included in a first wavelength multiplexed signal or a second wavelength multiplexed signal;

a second wavelength selector configured to multiplex by wavelength and output optical signals included in the first wavelength multiplexed signal or the second wavelength multiplexed signal;

a first optical switch configured to output the first wavelength multiplexed signal to the first wavelength selector or the second wavelength selector, based on states of the first wavelength selector and the second wavelength selector;

a second optical switch configured to output the second wavelength multiplexed signal to the first wavelength selector or the second wavelength selector, based on the states; and a first branch coupling circuit configured to couple an output of the first wavelength selector and an output of the second wavelength selector.

2. The optical multiplexing and demultiplexing device according to claim 1, wherein the first and second optical switches respectively output the first and second wavelength multiplexed signals to the first wavelength selector when the first wavelength selector is normal, and respectively output the first and second wavelength multiplexed signals to the second wavelength selector when the first wavelength selector is failed and the second wavelength selector is normal.

3. The optical multiplexing and demultiplexing device according to claim 2, wherein the first wavelength multiplexed signal includes a first optical signal having a first wavelength and a second optical signal having a second wavelength;

the second wavelength multiplexed signal includes a third optical signal having the first wavelength and a fourth optical signal having the second wavelength; and the first and second wavelength selector output an optical signal generated by multiplexing the first optical signal and the fourth optical signal.

4. The optical multiplexing and demultiplexing device according to claim 3, further comprising a control circuit that supplies power only to the first wavelength selector or the second wavelength selector into which the first and second wavelength multiplexed signals are input.

5. The optical multiplexing and demultiplexing device according to claim 2, further comprising
a control circuit that supplies power only to the first wavelength selector or the second wavelength selector into which the first and second wavelength multiplexed signals are input.

6. The optical multiplexing and demultiplexing device according to claim 2, further comprising second branch coupling circuit configured to split the input first wavelength multiplexed signal into two, wherein
the second branch coupling circuit inputs one of the split first wavelength multiplexed signals into the first optical switch and outputs the other of the split first wavelength multiplexed signals.

7. The optical multiplexing and demultiplexing device according to claim 1,
wherein the first wavelength multiplexed signal includes a first optical signal having a first wavelength and a second optical signal having a second wavelength;
the second wavelength multiplexed signal includes a third optical signal having the first wavelength and a fourth optical signal having the second wavelength; and
the first and second wavelength selector output an optical signal generated by multiplexing the first optical signal and the fourth optical signal.

8. The optical multiplexing and demultiplexing device according to claim 7, further comprising
a control circuit that supplies power only to the first wavelength selector or the second wavelength selector into which the first and second wavelength multiplexed signals are input.

9. The optical multiplexing and demultiplexing device according to claim 7, further comprising second branch coupling circuit configured to split the input first wavelength multiplexed signal into two, wherein
the second branch coupling circuit inputs one of the split first wavelength multiplexed signals into the first optical switch and outputs the other of the split first wavelength multiplexed signals.

10. The optical multiplexing and demultiplexing device according to claim 1, further comprising
a control circuit that supplies power only to the first wavelength selector or the second wavelength selector into which the first and second wavelength multiplexed signals are input.

11. The optical multiplexing and demultiplexing device according to claim 10, further comprising second branch coupling circuit configured to split the input first wavelength multiplexed signal into two, wherein
the second branch coupling circuit inputs one of the split first wavelength multiplexed signals into the first optical switch and outputs the other of the split first wavelength multiplexed signals.

12. The optical multiplexing and demultiplexing device according to claim 1, further comprising second branch coupling circuit configured to split the input first wavelength multiplexed signal into two,
wherein
the second branch coupling circuit inputs one of the split first wavelength multiplexed signals into the first optical switch and outputs the other of the split first wavelength multiplexed signals.

13. A method of controlling an optical multiplexing and demultiplexing device, the method comprising:
by a first wavelength selector, multiplexing by wavelength and outputting optical signals included in a first wavelength multiplexed signal or a second wavelength multiplexed signal;
by a second wavelength selector, multiplexing by wavelength and outputting optical signals included in the first wavelength multiplexed signal or the second wavelength multiplexed signal;
based on states of the first wavelength selector and the second wavelength selector, by a first optical switch, outputting a first wavelength multiplexed signal to the first wavelength selector or the second wavelength selector;
based on the states, by a second optical switch, outputting a second wavelength multiplexed signal to the first wavelength selector or the second wavelength selector; and
coupling an output of the first wavelength selector and an output of the second wavelength selector.

* * * * *